United States Patent
Baik et al.

(10) Patent No.: US 9,129,177 B2
(45) Date of Patent: Sep. 8, 2015

(54) IMAGE CACHE

(71) Applicant: QUALCOMM Incorporated, San Diego, CA (US)

(72) Inventors: Young-Ki Baik, Seoul (KR); Hyung-Il Koo, Seoul (KR); Duck Hoon Kim, Seoul (KR)

(73) Assignee: QUALCOMM INCORPORATED, San Diego, CA (US)

( * ) Notice: Subject to any disclaimer, the term of this patent is extended or adjusted under 35 U.S.C. 154(b) by 146 days.

(21) Appl. No.: 13/736,527

(22) Filed: Jan. 8, 2013

(65) Prior Publication Data
US 2013/0177209 A1    Jul. 11, 2013

Related U.S. Application Data

(60) Provisional application No. 61/584,765, filed on Jan. 9, 2012.

(51) Int. Cl.
*G06K 9/00* (2006.01)
*G06K 9/18* (2006.01)
*G06K 9/03* (2006.01)
*G06K 9/22* (2006.01)

(52) U.S. Cl.
CPC ............. *G06K 9/18* (2013.01); *G06K 9/00671* (2013.01); *G06K 9/036* (2013.01); *G06K 9/228* (2013.01); *G06K 2209/01* (2013.01)

(58) Field of Classification Search
None
See application file for complete search history.

(56) References Cited

U.S. PATENT DOCUMENTS

| | | | |
|---|---|---|---|
| 5,896,470 A | 4/1999 | Miyaza | |
| 5,966,460 A | 10/1999 | Porter, III | |
| 7,194,144 B1 | 3/2007 | Sakai et al. | |
| 8,011,584 B2 | 9/2011 | Powell et al. | |
| 8,064,700 B2 | 11/2011 | King et al. | |
| 8,131,085 B2 | 3/2012 | Vincent et al. | |
| 2006/0017810 A1 | 1/2006 | Kurzweil et al. | |
| 2006/0222260 A1 | 10/2006 | Sambongi et al. | |
| 2006/0249581 A1 | 11/2006 | Smith | |
| 2008/0084499 A1 | 4/2008 | Kisacanin et al. | |
| 2009/0059316 A1 | 3/2009 | Irwin, Jr. et al. | |
| 2010/0246965 A1 | 9/2010 | Epshtein et al. | |
| 2011/0221927 A1 | 9/2011 | Takagi | |
| 2012/0245922 A1 * | 9/2012 | Kozlova et al. | 704/3 |

FOREIGN PATENT DOCUMENTS

| | | |
|---|---|---|
| EP | 2339534 A1 | 6/2011 |
| WO | 2008114104 A1 | 9/2008 |

OTHER PUBLICATIONS

International Search Report and Written Opinion—PCT/US2013/020699—ISA/EPO—Apr. 19, 2013.

\* cited by examiner

*Primary Examiner* — Siamak Harandi
(74) *Attorney, Agent, or Firm* — Kilpatrick Townsend & Stockton LLP

(57) ABSTRACT

Techniques described herein provide a method for automatically and intelligently creating and updating an OCR cache while performing OCR using a computing device. An image captured using a camera coupled to the computing device may be matched against prior images stored in the OCR cache. If a match is found, the OCR cache may be updated with new or better information utilizing the new image. The matched prior image may be retained in the OCR cache, or the new captured image may replace the matched prior image in the OCR cache. In one embodiment, techniques are described to remove or reduce glare before storing the image in the OCR cache. In some embodiments, glare is removed or reduced in the absence of performing OCR.

29 Claims, 17 Drawing Sheets

Image data,

[text1, ROI, confidence, estimated text color, estimated background color],

[text2, ROI, confidence, estimated text color, estimated background color],

⋮

[textN, ROI, confidence, estimated text color, estimated background color].

FIG. 13A

Image data,

Energy,

Affinity Matrix,

[text1, ROI, confidence, estimated text color, estimated background color],

[text2, ROI, confidence, estimated text color, estimated background color],

⋮

[textN, ROI, confidence, estimated text color, estimated background color],

[textN+1, ROI, confidence, estimated text color, estimated background color].

FIG. 13B

IMAGE CACHE

CROSS-REFERENCE TO RELATED APPLICATIONS

This patent application claims the benefit of U.S. Provisional Patent Application Ser. No. 61/584,765 filed Jan. 9, 2012, and titled "OCR CACHE," which is incorporated by reference herein in its entirety for all purposes.

BACKGROUND

Optical character recognition (OCR) is a mechanical or electronic translation of scanned images of handwritten, typewritten or printed text, graphics or symbols into machine-encoded text. OCR is a growing field of research in computer vision and augmented reality applications. Computer vision allows a device to perceive the environment in its vicinity. Computer vision enables applications in augmented reality by allowing the sensory input from the end-user's interaction with the real world to extend into the virtual world. In a real life example application, computer vision enabled OCR may help visually disabled individuals in perceiving written text and symbols in the field of view of a camera of a personal mobile device such as a smart phone.

SUMMARY

Techniques described herein provide a method for automatically and intelligently creating and/or updating an OCR cache while performing OCR using a mobile device in applications of augmented reality. An image captured using a camera coupled to the mobile device is matched against prior images stored in the OCR cache. If a match is found, the OCR cache is updated with new and/or better information utilizing the new image, instead of storing the new image as a separate entry in the OCR cache. Alternately, the new image may replace the prior image in the OCR cache. In addition, techniques are described to remove glare from an image using multiple images. For example, glare from a region for an image may be removed by using information from another image from the same scene that does not have glare for the same region as the key image. In one embodiment, glare may be reduced or removed from images even in the absence of OCR. In one embodiment, glare reduction and OCR cache may be performed in combination.

The intelligent and automatic OCR cache update is advantageous to the user, since it allows the user to access all of the information associated with the same scene and/or may allow the user to access information associated with a plurality of scenes. Furthermore, with the overlap with image information between multiple images for the same scene over time, the techniques described herein may store the best or newly obtained information associated with the scene, therefore further refining the results over time. Other advantages associated with the techniques described herein may include reduced memory space for storing the OCR results and reduced number of hits to the OCR cache resulting in faster performance in the overall system.

By way of example, if the user is sitting at a restaurant and performing OCR on a dinner menu using traditional means for acquiring an image using the snapshot mode or the preview mode, the user may need to acquire multiple images and process the information associated with those images separately. If the user holds the camera acquiring the image too far away from the dinner menu, the image may not have enough resolution to adequately perform OCR on the image. On the other hand if the user brings the camera acquiring the image too close, the image may not include the entire area of interest. However, using the OCR caching mode with automatic and intelligent OCR cache update, the techniques described herein allow the user to generate a single image that includes the area of interest for the user from the menu with the proper focus at a good resolution. In one instance, the user may choose to select the text from the menu and translate it to another language or perform a search using an online search engine.

In the above example, one of the images from the scene may have glare associated with a region of the image. Techniques described may facilitate removing glare by identifying a first region with glare from a first image, identifying a second region without glare from a second image, wherein the first region and the second region represent the same region from the same scene. A final image is composited using the first image and the second region without glare from the second image to remove glare.

An exemplary method for performing embodiments of the invention may include receiving a plurality of images, recognizing data in each of the plurality of images, wherein recognizing data in each of the plurality of images comprises performing optical character recognition on the plurality of images, determining that at least two images of the plurality of images comprise information from a first scene, based at least in part on the recognized data, and storing a final image representing the first scene using at least one image of the at least two images and the recognized data associated with the at least one image. In one embodiment, receiving comprises serially capturing the plurality of images using a camera. In one implementation, the storage of the at least one image of the plurality of images and the recognized data for the at least one image is maintained while a following image is captured and data is recognized in the following image. In one aspect, determining that at least two images of the plurality of images comprise information from a first scene may include comparing one or more of graphical object values, graphical object colors, background color and foreground color in each of the two or more images.

In one embodiment, prior to storing the final image, the method further comprises compositing the final image using the at least two images and the recognized data associated with the at least two images and then subsequently storing the final image. In one implementation, the compositing comprises incorporating elements from a second image of the at least two images into the at least one image to create the final image. In another embodiment, the final image comprises the at least one image, wherein the compositing comprises incorporating the associated data of a second image of the at least two images into the associated data of the at least one image.

In another embodiment, prior to storing the final image, the method further comprises selecting the at least one image from the at least two images to represent the first scene as the final image and then subsequently storing the final image. Selecting may comprise comparing an energy of each of the two or more images. Calculating the energy of each of the two or more images may be based on a number of graphical objects recognized in each image and a confidence for the recognition of each of the number of graphical objects.

The method may further include determining that one or more images of the plurality of images comprise information from one or more scenes other than the first scene, and displaying the final image and one or more images respectively representing the one or more scenes or the recognized data for the at least one image and for the one or more scenes. Furthermore, the method performed by embodiments of the invention may also include determining that a user selected one of the displayed images or displayed recognized data for the one image, and inputting information related to the selected image or recognized data into a program or application.

In one implementation, the method may also remove or reduce glare by identifying a first region with glare from a first image from the two or more images from the first scene, identifying a second region without glare from a second image from the two or more images from the first scene, wherein the first region and the second region represent the same region of the first scene, and compositing the final image with reduced glare using the first image and the second region without glare from the second image.

An exemplary device for performing embodiments of the invention may include an image capture module configured to receive a plurality of images, an OCR engine configured to recognize data in each of the plurality of images using optical character recognition, a matching module configured to determine that the at least two images of the plurality of images comprise information from a first scene, based at least in part on the recognized data, and an integration module configured to store a final image representing the first scene using at least one image of the at least two images and the recognized data associated with the at least one image. The images may be captured or obtained serially using a camera coupled to the device. In one embodiment, determining comprises comparing one or more of graphical object values, graphical object colors, background color, foreground color and a boundary box in each of the two or more images.

The integration module may be further configured to composite the final image using the at least two images and the recognized data associated with the at least two images and then subsequently storing the final image. In one embodiment, the compositing comprises incorporating elements from a second image of the at least two images into the at least one image to create the final image. In another embodiment, the final image comprises the at least one image, wherein the compositing comprises incorporating the associated data of a second image of the at least two images into the associated data of the at least one image.

Prior to storing the final image, a selection module may be configured to select the at least one image from the at least two images to represent the first scene as the final image and then subsequently storing the final image. In one implementation, the selecting comprises comparing an energy of each of the two or more images. Calculating the energy of each of the two or more images based on a number of graphical objects recognized in each image and a confidence for the recognition of each of the number of graphical objects.

The device may also comprise a device display configured to display the at least two images or data recognized for the at least the two images. The device may further comprise determining that a user touched the one of the displayed images or displayed recognized data for the one image, and inputting information related to the touched image or recognized data into a program or application. Inputting may comprise submitting an internet query, determining a translation, or entering text.

In one example of the device, prior to storing the final image, the device is further configured to identify a first region with glare from a first image from the two or more images from the first scene, identify a second region without glare from a second image from the two or more images from the first scene, wherein the first region and the second region represent the same region of the first scene, and composite the final image with reduced glare using the first image and the second region without glare from the second image.

An exemplary non-transitory computer readable storage medium, wherein the non-transitory computer readable storage medium comprises instructions executable by a processor, the instructions comprising instructions to receive a plurality of images, recognize data in each of the plurality of images, wherein recognizing data in each of the plurality of images comprises performing optical character recognition on the plurality of images, determine that at least two images of the plurality of images comprise information from a first scene, based at least in part on the recognized data; and store a final image representing the first scene using at least one image of the at least two images and the recognized data associated with the at least one image.

An exemplary apparatus may include means for receiving a plurality of images, means for recognizing data in each of the plurality of images, wherein recognizing data in each of the plurality of images comprises performing optical character recognition on the plurality of images, means for determining that at least two images of the plurality of images comprise information from a first scene, based at least in part on the recognized data, and means for storing a final image representing the first scene using at least one image of the at least two images and the recognized data associated with the at least one image. The plurality of images may be serially captured using a camera. The storage of the at least one image of the plurality of images and the recognized data for the at least one image may be maintained while a following image is captured and data is recognized in the following image. In one aspect, determining that at least two images of the plurality of images comprise information from a first scene may include comparing one or more of graphical object values, graphical object colors, background color and foreground color in each of the two or more images.

In one embodiment, prior to storing the final image, the method may further comprise means for compositing the final image using the at least two images and the recognized data associated with the at least two images and then subsequently storing the final image. In another embodiment, prior to storing the final image, the apparatus further may comprise means for selecting the at least one image from the at least two images to represent the first scene as the final image and then subsequently storing the final image. The selecting may comprise means for comparing an energy of each of the two or more images. Calculating the energy of each of the two or more images may be based on a number of graphical objects recognized in each image and a confidence for the recognition of each of the number of graphical objects.

In one embodiment, prior to storing the final image may include means for identifying a first region with glare from a first image from the two or more images from the first scene, means for identifying a second region without glare from a second image from the two or more images from the first scene, wherein the first region and the second region represent the same region of the first scene, and means for compositing the final image with reduced glare using the first image and the second region without glare from the second image.

The foregoing has outlined rather broadly features and technical advantages of examples in order that the detailed description that follows can be better understood. Additional features and advantages will be described hereinafter. The conception and specific examples disclosed can be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages, will be better understood from the following description when considered in connection with the accompanying figures. Each of the figures is provided for the purpose of illustration and description only and not as a definition of the limits of the claims.

BRIEF DESCRIPTION OF THE DRAWINGS

Aspects of the disclosure are illustrated by way of example. The following description is provided with reference to the drawings, where like reference numerals are used to refer to like elements throughout. While various details of one or more techniques are described herein, other techniques are also possible. In some instances, well-known structures and devices are shown in block diagram form in order to facilitate describing various techniques.

A further understanding of the nature and advantages of examples provided by the disclosure can be realized by reference to the remaining portions of the specification and the drawings, wherein like reference numerals are used throughout the several drawings to refer to similar components. In some instances, a sub-label is associated with a reference numeral to denote one of multiple similar components. When reference is made to a reference numeral without specification to an existing sub-label, the reference numeral refers to all such similar components.

FIGS. 13A and 13B depict exemplary scene descriptors for an image containing text.

DETAILED DESCRIPTION

Images comprising text in the field of view of the camera coupled to a mobile device may be obtained using snapshot mode or preview mode in some implementations. In snapshot mode, the user focuses the camera on the text that the user is interested in capturing from the field of view and takes a photograph. The resulting picture may be analyzed by a computer device and the OCR results are generated. On the other hand, preview mode loops the recognition of text in the field of view continuously and performs OCR on each image or frame obtained. This mode shows a dynamic, real-time display of what the device is recognizing, in some instances right beside the camera viewfinder. When the user would like to spend more time reviewing the OCR results of an image or utilize the results, the user may stop the image capture/OCR recognition and may thereafter proceed with the results currently displayed by the frozen capture/recognition.

The snapshot mode and the preview mode, as implemented in the related art applications, do not have mechanisms for automatic history archiving. When the user is faced with a large input target or many targets, the user has to resort to taking multiple images through the snapshot mode or the preview mode, freezing the OCR engine for each image and separately analyzing each image. Especially in the preview mode, the user is inundated with many images of the same scene repeatedly taken while the user slowly moves the mobile device over the area of interest. Also, current OCR systems do not have a mechanism of aggregating information from different OCR results to improve the OCR performance, or of reducing glare in the resultant cached images.

Embodiments of the invention address these and other problems.

Figure 1:
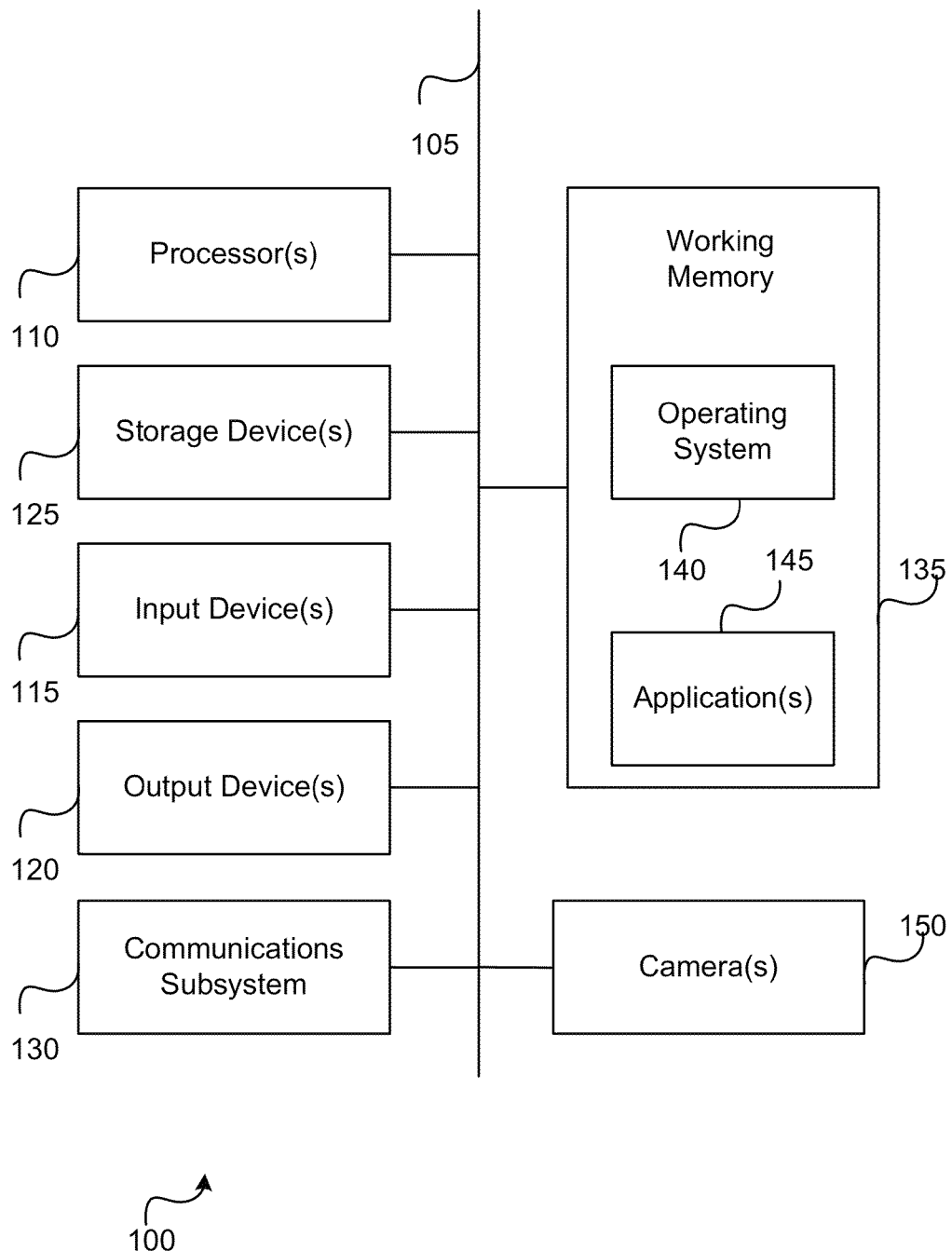
FIG. 1 illustrates an exemplary computer device incorporating parts of the device employed in practicing embodiments of the invention.

FIG. 1 illustrates an exemplary computer device incorporating parts of the device employed in practicing embodiments of the invention. A computer device as illustrated in FIG. 1 may be incorporated as part of any computerized system, herein. For example, computer device 100 can represent some of the components of a mobile device. A mobile device may be any computing device 100 with one or more input sensory unit or input devices 115 such as a camera 150 and one or more input/output devices such as a display unit or a touch screen. Examples of a mobile device include but are not limited to video game consoles, tablets, smart phones, laptops, netbooks, or other portable devices. FIG. 1 provides a schematic illustration of one embodiment of a computer device 100 that can perform the methods provided by various other embodiments, as described herein, and/or can function as the host computer device, a remote kiosk/terminal, a point-of-sale device, a mobile device, a set-top box and/or a computer device. FIG. 1 is meant only to provide a generalized illustration of various components, any or all of which may be utilized as appropriate. FIG. 1, therefore, broadly illustrates how individual system elements may be implemented in a relatively separated or relatively more integrated manner.

The computer device 100 is shown comprising hardware elements that can be electrically coupled via a bus 105 (or may otherwise be in communication, as appropriate). The hardware elements may include one or more processors 110, including without limitation one or more general-purpose processors and/or one or more special-purpose processors (such as digital signal processing chips, graphics acceleration processors, and/or the like); one or more input devices 115, which can include without limitation a camera, sensors (including inertial sensors), a mouse, a keyboard and/or the like; and one or more output devices 120, which can include without limitation a display unit such as the device display (1118) of FIG. 11 and FIG. 12, a printer and/or the like.

The computer device 100 may further include (and/or be in communication with) one or more non-transitory storage devices 125, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like. Device storage 1120 from FIG. 11 and FIG. 12 may use one or more non-transitory storage devices as discussed above.

The computer device 100 might also include a communications subsystem 130, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 130 may permit data to be exchanged with a network (such as the network described below, to name one example), other computer devices, and/or any other devices described herein. The communications subsystem 130 may be omitted in some embodiments, for example in devices which are not configured to communicate with other devices. In many embodiments, the computer device 100 will further comprise a non-transitory working memory 135, which can include a RAM or ROM device, as described above. The OCR cache (1112) may be implemented using non-transitory working memory 135, as described above.

The computer device 100 also can comprise software elements, shown as being currently located within the working memory 135, including an operating system 140, device drivers, executable libraries, and/or other code, such as one or more application programs 145, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 125 described above. In some cases, the storage medium might be incorporated within a computer device, such as computer device 100. In other embodiments, the storage medium might be separate from a computer device (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer device 100 and/or might take the form of source and/or installable code, which, upon compilation and/or installation on the computer device 100 (e.g., using any of a variety of generally available compilers, installation programs, compression/decompression utilities, etc.) then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer device (such as the computer device 100) to perform methods in accordance with the disclosure. For example, some or all of the procedures of the described methods may be performed by the computer device 100 in response to processor 110 executing one or more sequences of one or more instructions (which might be incorporated into the operating system 140 and/or other code, such as an application program 145) contained in the working memory 135. Such instructions may be read into the working memory 135 from another computer-readable medium, such as one or more of the storage device(s) 125. Merely by way of example, execution of the sequences of instructions contained in the working memory 135 might cause the processor(s) 110 to perform one or more procedures of the methods described herein.

The terms "machine-readable medium" and "computer-readable medium," as used herein, refer to any medium that participates in providing data that causes a machine to operate in a specific fashion. In an embodiment implemented using the computer device 100, various computer-readable media might be involved in providing instructions/code to processor(s) 110 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 125. Volatile media include, without limitation, dynamic memory, such as the working memory 135. Transmission media include, without limitation, coaxial cables, copper wire and fiber optics, including the wires that comprise the bus 105, as well as the various components of the communications subsystem 130 (and/or the media by which the communications subsystem 130 provides communication with other devices). Hence, transmission media can also take the form of waves (including without limitation radio, acoustic and/or light waves, such as those generated during radio-wave and infrared data communications).

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, a carrier wave as described hereinafter, or any other medium from which a computer can read instructions and/or code.

Various forms of computer-readable media may be involved in carrying one or more sequences of one or more instructions to the processor(s) 110 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer device 100. These signals, which might be in the form of electromagnetic signals, acoustic signals, optical signals and/or the like, are all examples of carrier waves on which instructions can be encoded, in accordance with various embodiments of the invention.

The communications subsystem 130 (and/or components thereof) generally will receive the signals, and the bus 105 then might carry the signals (and/or the data, instructions, etc. carried by the signals) to the working memory 135, from which the processor(s) 110 retrieves and executes the instructions. The instructions received by the working memory 135 may optionally be stored on a non-transitory storage device 125 either before or after execution by the processor(s) 110.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing embodiments of the invention. Various changes may be made in the function and arrangement of elements without departing from the spirit and scope of the invention.

Also, some embodiments are described as processes depicted as flow diagrams or block diagrams. Although each may describe the operations as a sequential process, many of the operations can be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

Several embodiments are described herein, but various modifications, alternative constructions, and equivalents may be used without departing from the spirit of the disclosure. For example, the above elements may merely be a component of a larger system, wherein other rules may take precedence over or otherwise modify the application of the invention. Also, a number of steps may be undertaken before, during, or after elements are considered. Accordingly, the description herein does not limit the scope of the disclosure.

As described herein, a graphical object from an image may include but is not limited to one or more symbols, alphanumeric characters, words, signs, numbers, text or gestures. For example, a graphical object in an image may be a word or a sentence in any language. A word may be represented as a symbol in some languages. Similarly, a sentence in one language or culture may be represented simply using a symbol in another language or culture. In another example, a graphical object may be a street sign such as STOP, YIELD, etc. Different graphical objects may be used in different regions, languages or cultures to represent the same meaning.

Figure 2:
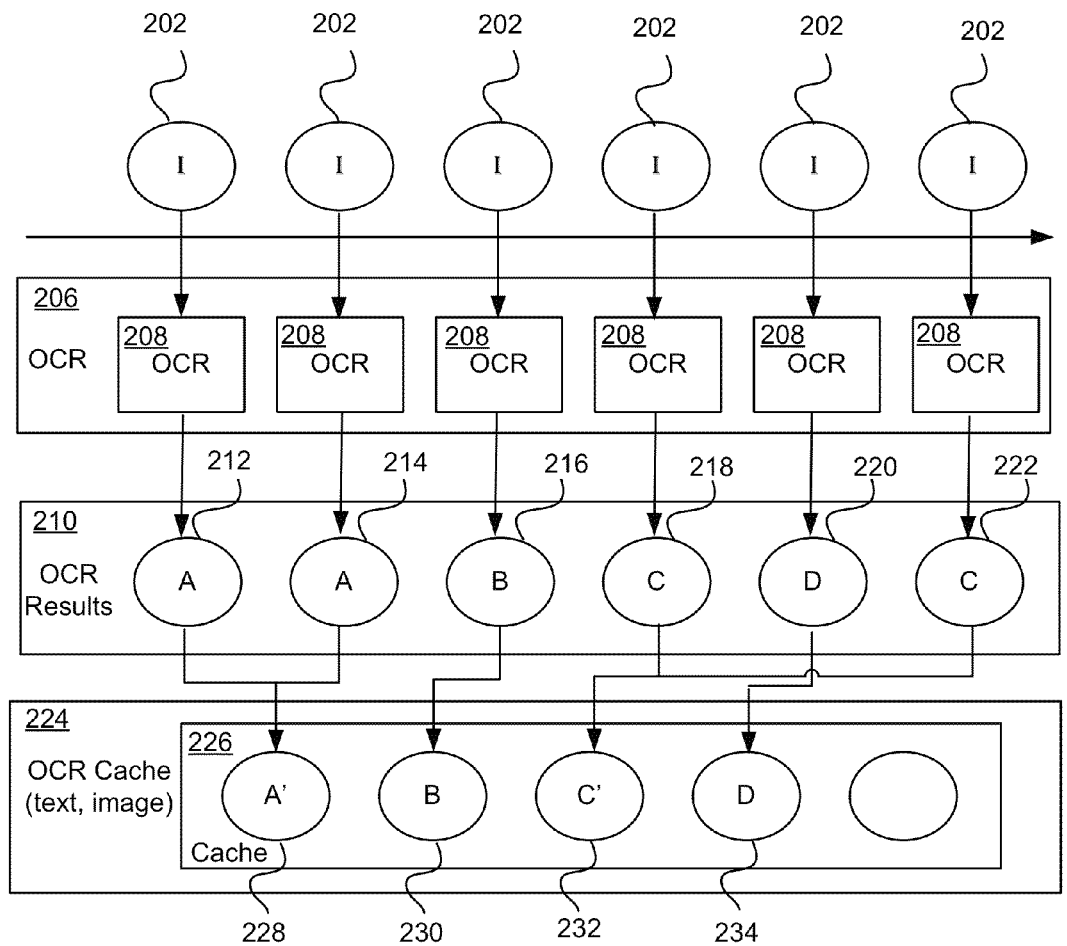
FIG. 2 is a flow diagram, illustrating an exemplary embodiment of the invention for OCR processing of images over time.

FIG. 2 is a flow diagram, illustrating an exemplary embodiment of the invention for processing of images over time. Computer device 100 discussed in reference to FIG. 1, above, can represent some of the components of the mobile device used for performing the embodiments of the invention described in FIG. 2. Modules and components discussed in FIG. 11 may be implemented as components of the computing device 100 discussed in FIG. 1 and may be used in performing embodiments of the invention as discussed in FIG. 2. Modules and components discussed below may be performed using software, hardware, firmware or any combination thereof. In one aspect, in a mode referred to herein as the OCR caching mode, the camera coupled to the computer device 100 continuously obtains images over time.

In FIG. 2, the plurality of images are represented by I (202), where each 1202 represents a different received image. In one embodiment, the image capture module 1102, may obtain or receive the images using one or more cameras 150 coupled to the computing device 100. In aspects of the invention, as the images are received, the OCR engine 206 (1104 of FIG. 11) may process the images producing OCR results 210 for each image, recognizing data in each of the plurality of images. The OCR engine 206 may be implemented in hardware, software or firmware. The instructions for the OCR implemented in software/firmware may be temporarily stored in the working memory 135 and executed on one or more processors 110 of the computing device 100. In some embodiments, some or all of the OCR processing by the OCR engine 206 may be performed by a remote server (not shown) connected to the computing device 100 over the network. In some embodiments, the image quality of the stored result is improved over time. For example, in one embodiment, glare may be removed from the images in addition to or independent of performing OCR. In the OCR caching mode, images obtained using a snapshot mode over time may also use techniques described herein to store images in the OCR cache intelligently and automatically. OCR cache may be implemented using the storage device 125, working memory 135, hardware registers (not shown) or buffers or in any combination thereof.

The OCR results may consist of additional data about the image that describes the characteristics of the image. In one implementation, the scene descriptor generator module 1106 generates the OCR results for the image as a scene descriptor for the image and temporarily stores it in the OCR cache. After the scene descriptor module 1106 generates the scene descriptors, components of the computing device 100, such as the matching module 1108, may detect images associated with the same scene by using the matching process. In one implementation, the matching module may compare the scene descriptors associated with the images during the matching process. In FIG. 2, the recognized data from the OCR results 212 and 214 are associated with scene A, OCR result 216 is associated with scene B, OCR results 218 and 222 are associated with scene C, and OCR result 220 is associated with scene D.

Instead of storing all of the 212-222 OCR results and the associated images in the OCR cache 224, the OCR caching system intelligently and automatically may store only one refined image and the OCR results for each scene. Components of the computing device 100, such as a selection module 1110 may select an image from the plurality of images from the scene to store in the OCR cache 224. The process of selecting the image by the selection module 1110 may be referred to as the selection process. For instance, in FIG. 2, images corresponding to OCR results 212 and 214 representing scene A, may be stored as A' (228) in the OCR cache 224. The final composited or selected image and the scene descriptor are stored in the OCR cache 224 using images corresponding to 212 and 214. In one aspect, the selection module calculates an energy associated with each image as part of the selection process. The energy associated with an image may represent the clarity and resolution associated with the image. The image and associated scene descriptor with the higher energy from the two images (corresponding to 212 and 214) may be stored in the OCR cache 224 as A' (228). The OCR cache 224 may be implemented using non-transitory working memory 135, as described above in reference with FIG. 1.

In another implementation, an integration module 1114 may add image data missing from the key image using the different image qualities and OCR results between 212 and 214, while compositing the final A' (228). The process of compositing the final result may be referred to as an integration process. In one example, one of the images (say corresponding to 212) from the scene may have glare associated with a region of the image. The integration process may facilitate removing the glare by identifying a first region with glare from the image corresponding to 212, identifying a second region without glare from the image corresponding to 214, wherein the first region and the second region represent the same region of scene A; and compositing a final image using the image corresponding to 212 and the second region without glare from the image corresponding to 214 to remove glare.

Similarly, images corresponding to 218 and 222 are recognized as being associated with the same scene C and are composited to form a final image and scene descriptor C' (232). Compositing an image, as described herein, may include but is not limited to updating or replacing the image or any associated data including the scene descriptor for the image or a representation of the image in the OCR cache. Thus, in some embodiments, compositing an image or compositing a plurality of images together may include updating or modifying data associated with a first image, for example with data from a second image (or with a plurality of images), without changing or modifying an appearance or visual representation of the first image. The image corresponding to 216 is the only image representing scene B. Once the matching module 1108 determines that the image corresponding to 216 is the only image representing scene B, the insertion module 1116 may store the image corresponding to 216 in the OCR cache 224 at cache location 230. Similarly the image corresponding to 220 is the only image representing scene D and may be stored in the OCR cache 224 at cache location 234.

A received image may be associated with a scene that has other images associated with the same scene stored in a temporary buffer, OCR cache 224 or other suitable storage medium. If a recently received image matches an image and OCR result stored in the OCR cache 224 for the same scene, the information in the OCR cache 224 may be updated by the integration module 1114 for the scene after integrating the results of the most recently received image.

In one aspect, images are processed immediately as they are received. In another embodiment, obtained images are temporarily stored and processed together in batches, potentially allowing fewer OCR cache updates. In yet another embodiment, a sliding window may be used to process images that fall within a specific window of time together. Processing may be performed at a mobile device, for example the computing device 100, or information may be transmitted to a remote server or processor for processing. For example, in one implementation, the computing device 100 may receive a plurality of images and transmit the images or information related to the images to a remote server to perform OCR, the matching process, the selection process, and/or the integration process.

This intelligent and automatic OCR cache update is advantageous to the user, since this may allow the user to access all of the information associated with the same scene or with a plurality of scenes. Furthermore, with the overlap with image information between multiple images for the same scene over time, the techniques described herein may store the best information or newly acquired information associated with the scene, therefore further refining the results over time. Other advantages associated with the techniques described herein may include reduced memory space needed for storing the OCR results and reduced number of hits to the OCR cache resulting in faster performance in the overall system.

By way of example, if the user is sitting at a restaurant and performing OCR on a dinner menu using traditional means for acquiring an image using the snapshot mode or the preview mode, the user may need to separately acquire multiple images and sequentially process the information associated with each of those images. If the user holds the camera acquiring the image too far away from the dinner menu, the image may not have enough resolution to adequately perform OCR on the image. On the other hand if the user brings the camera acquiring the image too close, the image may not include the entire area of interest. However, using aspects of the invention in the OCR caching mode with automatic and intelligent OCR cache update, the techniques described herein allow the user to generate a single image that includes the area of interest for the user from the menu with the proper focus at a good resolution. In one instance, the user may choose to select the text from the menu and translate it to another language or perform a search using a proprietary or online search engine. In some embodiments, the user may select text from the menu to enter into an application or program, for example a text messaging or email program or a word processor.

Figure 3A:
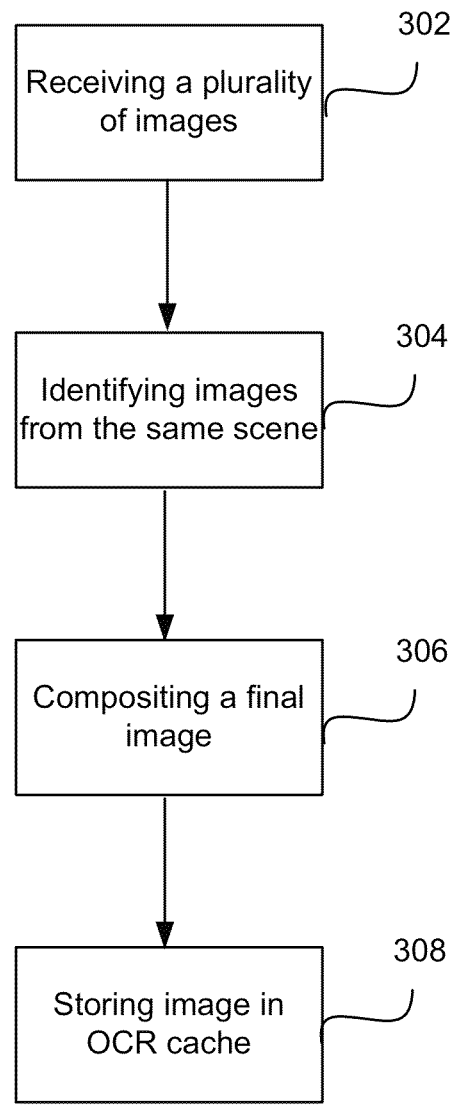
FIG. 3A illustrates a flow diagram, showing a non-limiting exemplary embodiment of the invention for OCR processing of images.

FIG. 3A illustrates a flow diagram, showing a non-limiting exemplary embodiment of the invention for processing of images according to one or more illustrative aspects of the disclosure. According to one or more aspects, any and/or all of the methods and/or method steps described herein may be implemented by and/or in a computing device 100, such as the computing device 100 and/or the device described in greater detail in FIG. 1, for instance. In one embodiment, one or more of the method steps described below with respect to FIG. 3A are implemented by a processor of the device 100 such as the processor 110 or another processor. Modules and components discussed in FIG. 11 and FIG. 12 may also be implemented as components of the computing device 100 and may be used in performing embodiments of the invention as discussed in FIG. 3A. Additionally or alternatively, any and/or all of the methods and/or method steps described herein may be implemented in computer-readable instructions, such as computer-readable instructions stored on a computer-readable medium such as the memory 135, storage 125 or another computer readable medium.

Figure 11:
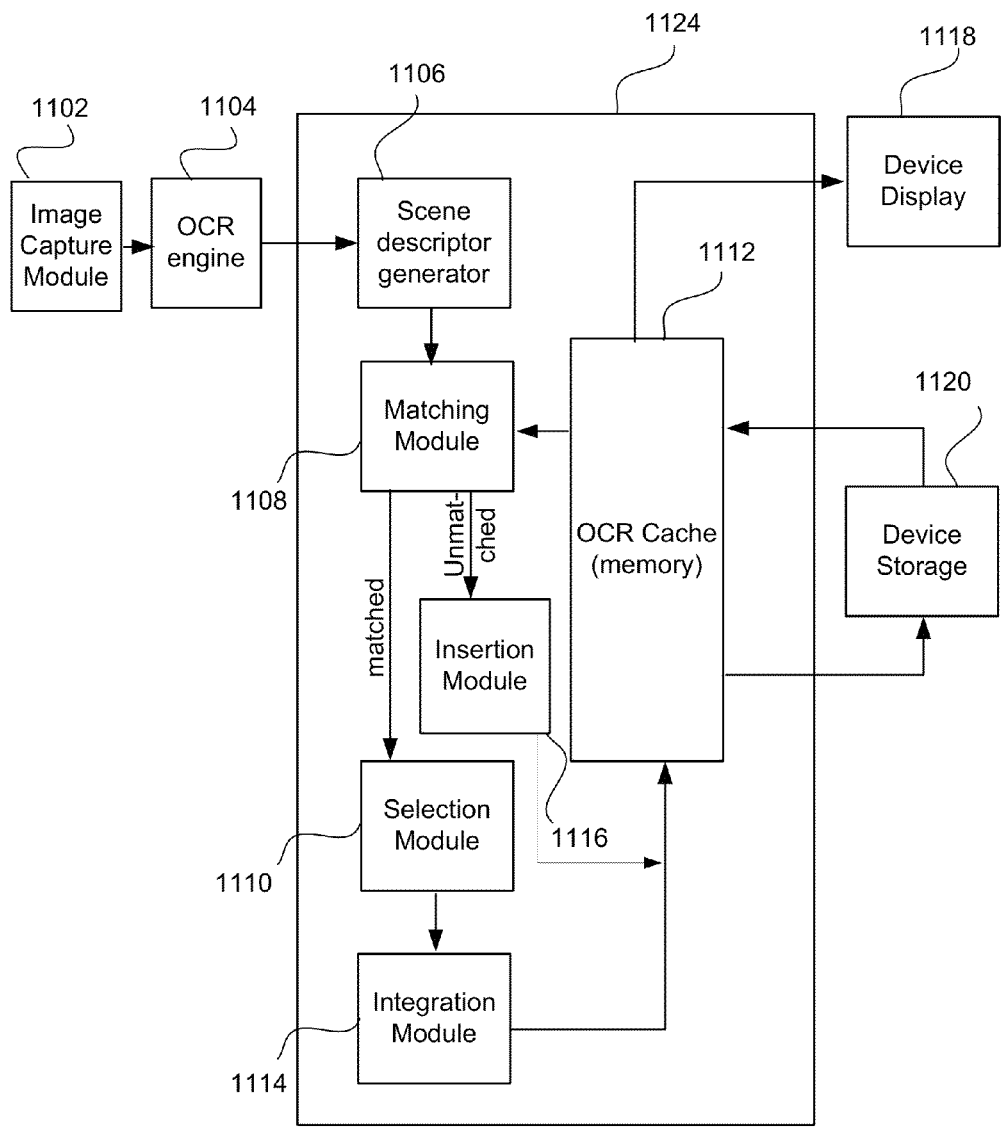
FIG. 11 depicts a block diagram, showing exemplary components for performing methods provided by embodiments of the invention.
Figure 12:
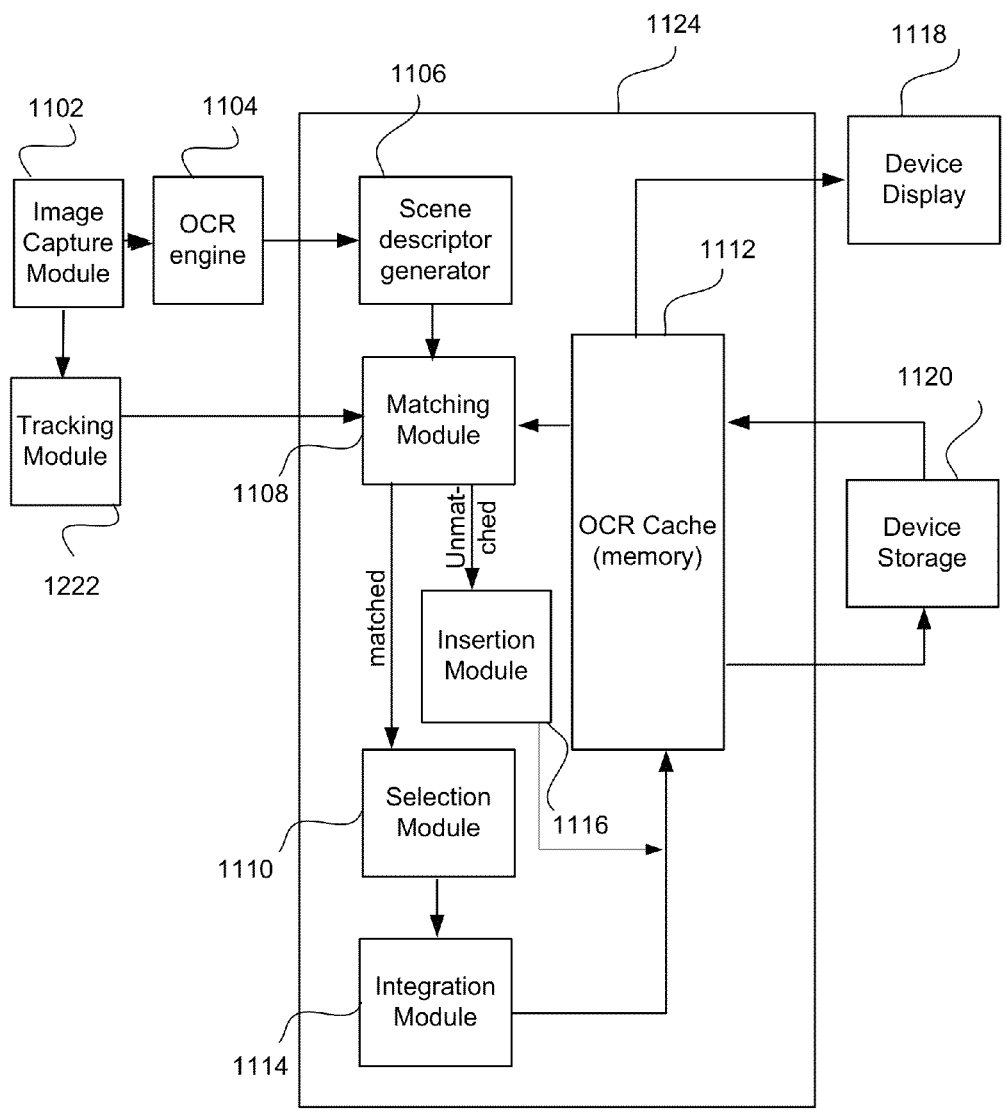
FIG. 12 depicts another block diagram, showing exemplary components for performing methods provided by embodiments of the invention.

In FIG. 3A, computing device 100 discussed in reference to FIG. 1 above and modules and components discussed in FIG. 11 and FIG. 12 can represent some of the modules and components of the device used for performing embodiments of the invention. At step 302, the camera 150 coupled to the computing device 100 receives or obtains a plurality of images. The camera 150 may represent one of the input devices 115 described in FIG. 1. In one implementation, an image capture module 1102 from FIG. 11 may be used for obtaining the image. The plurality of images may be received serially in some embodiments. In other embodiments, for instance when multiple cameras 150 or a stereo camera is coupled to the computing device 100, the images may be received simultaneously. At step 304, the received images and the data associated with the images are compared against each other and also the OCR results and the images stored in the OCR cache 224 to determine if more than one image is associated with the same scene. In one implementation, the OCR cache operates from the working memory 135 described in FIG. 1.

At block 306, if more than one image associated with the same scene is detected, the images may be integrated or composited together to form a composited image through the integration process. In one aspect, a selection process precedes the integration process. During the selection process, a key image representing the scene may be selected from the plurality of images representing the scene, out of which one or more of the plurality of images may be stored on the computing device 100. The key image may be determined by calculating the energy associated with each image. In one implementation, the energy associated with each image is directly proportional to the number of recognized words using the OCR engine and confidence associated with the OCR results for each image. In one embodiment, the key image may be the image that is stored in the OCR cache. In other implementations, the key image may be enhanced or augmented by compositing a final image using information from the various images from the same scene before storing the image in the OCR cache. For instance, if a word displayed in the key image is not decipherable or detectable, information from other images from the same scene may be used to enhance the image and the data associated with the image. In another example, glare from a region of the key image may be removed by using information from another image from the same scene that does not have glare for the same region as the key image. As described above, glare may be reduced or removed from images even in the absence of OCR. Information from various images may be used in compositing the final image that may be stored in the OCR cache or another cache, for example an image cache that may or may not include OCR information. For example, an image cache may be used to store a final image having a reduced glare. Such image cache may omit OCR information or may include OCR information in some embodiments.

At block 308, once the final image is composited by the computing device 100, the image may be stored in the OCR cache. In some instances, a pre-existing image and OCR result in the OCR cache is updated or replaced. For instance, if the received or obtained image is associated with the same scene as stored in the OCR cache, but with better resolution and clarity than the image stored in the OCR cache, the image and the OCR results in the OCR cache may be updated or replaced to reflect the information associated with the newly received image. Compositing an image, as described herein, may include but is not limited to updating or replacing the image or any associated data including portions of the scene descriptor for the image or a representation of the image in the OCR cache.

It should be appreciated that the specific steps illustrated in FIG. 3A provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 3A may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 3B:
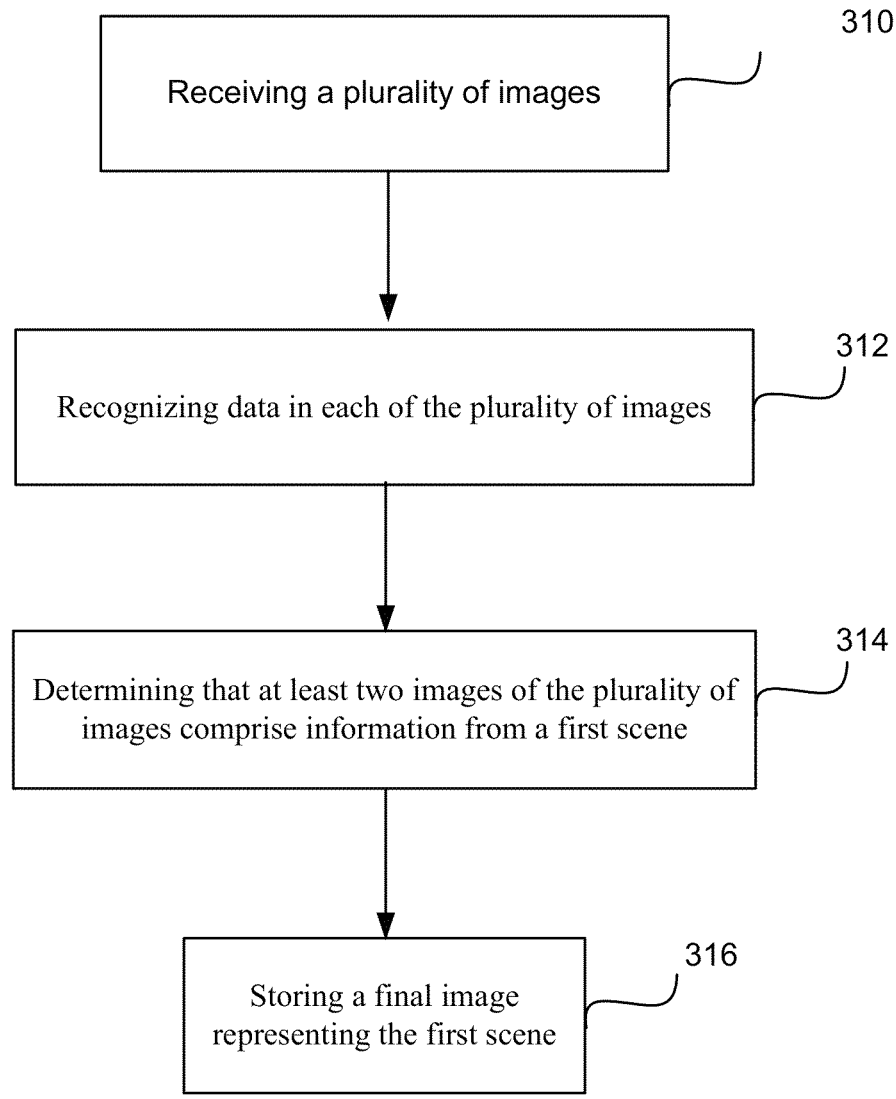
FIG. 3B illustrates a flow diagram, showing another non-limiting exemplary embodiment of the invention for OCR processing of images.

FIG. 3B illustrates a flow diagram, showing another non-limiting exemplary embodiment of the invention for processing of images according to one or more illustrative aspects of the disclosure. According to one or more aspects, any and/or all of the methods and/or method steps described herein may be implemented by and/or in a computing device 100, such as the computing device 100 and/or the device described in greater detail in FIG. 1, for instance. In one embodiment, one or more of the method steps described below with respect to FIG. 3B are implemented by a processor of the device 100 such as the processor 110 or another processor. Modules and components discussed in FIG. 11 and FIG. 12 may also be implemented as components of the computing device 100 and may be used in performing embodiments of the invention as discussed in FIG. 3B. Additionally or alternatively, any and/or all of the methods and/or method steps described herein may be implemented in computer-readable instructions, such as computer-readable instructions stored on a computer-readable medium such as the memory 135, storage 125 or another computer readable medium.

In FIG. 3B, computing device 100 discussed in reference to FIG. 1 above and modules and components discussed in FIG. 11 and FIG. 12 can represent some of the modules and components of the device used for performing embodiments of the invention. At step 310, the camera 150 coupled to the computing device 100 receives or obtains a plurality of images. The camera 150 may represent one of the input devices 115 described in FIG. 1. In one implementation, an image capture module 1102 from FIG. 11 may be used for obtaining the image. The plurality of images may be received serially in some embodiments. In other embodiments, for instance when multiple cameras 150 or a stereo camera is coupled to the computing device 100, the images may be received simultaneously.

At step 312, components of the computing device 100, such as the OCR engine 1104 or/and the scene descriptor module 1106, may recognize data in each of the plurality of images, wherein recognizing data in each of the plurality of images comprises performing optical character recognition on the plurality of images. The steps performed by the OCR engine 1104 and the scene descriptor 1106 in recognizing the data is described in more detail in FIG. 4 and FIG. 11.

At step 314, components of the computing device 100, such as matching module 1108, may determine that at least two images of the plurality of images comprise information from a first scene, based at least in part on the recognized data.

The steps performed by the matching module 1108 are described in more detail in FIGS. 5, 6, 7, 8 and 11.

At step 316, components of the computing device 100, such as the integration module 1114, may store a final image representing the first scene using at least one image of the at least two images and the recognized data associated with the at least one image. In one embodiment, if more than one image associated with the same scene is detected, the images may be integrated or composited together to form a composited image through the integration process. The steps performed by the integration module 1114 are described in more detail in FIGS. 8, 9, 10 and 11.

It should be appreciated that the specific steps illustrated in FIG. 3B provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 3B may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 5:
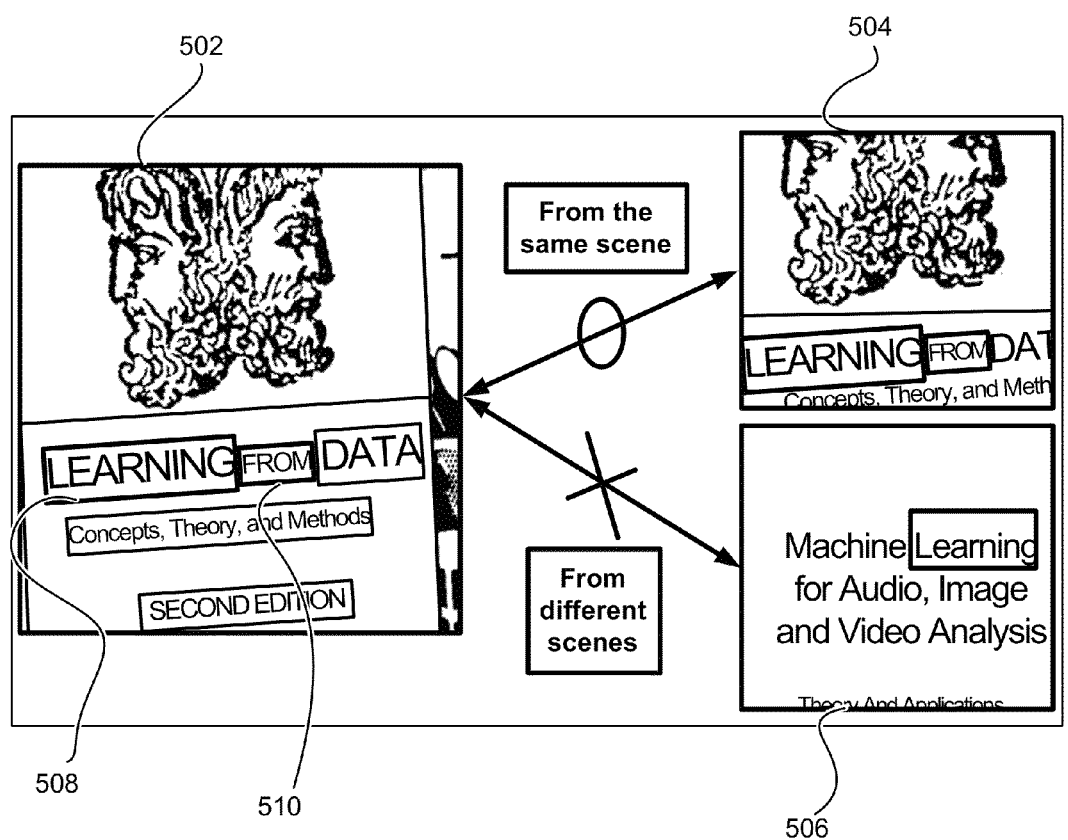
FIG. 5 depicts block diagrams, showing a selection of an image from a plurality of images representing the same scene as a stored image.
Figure 6:
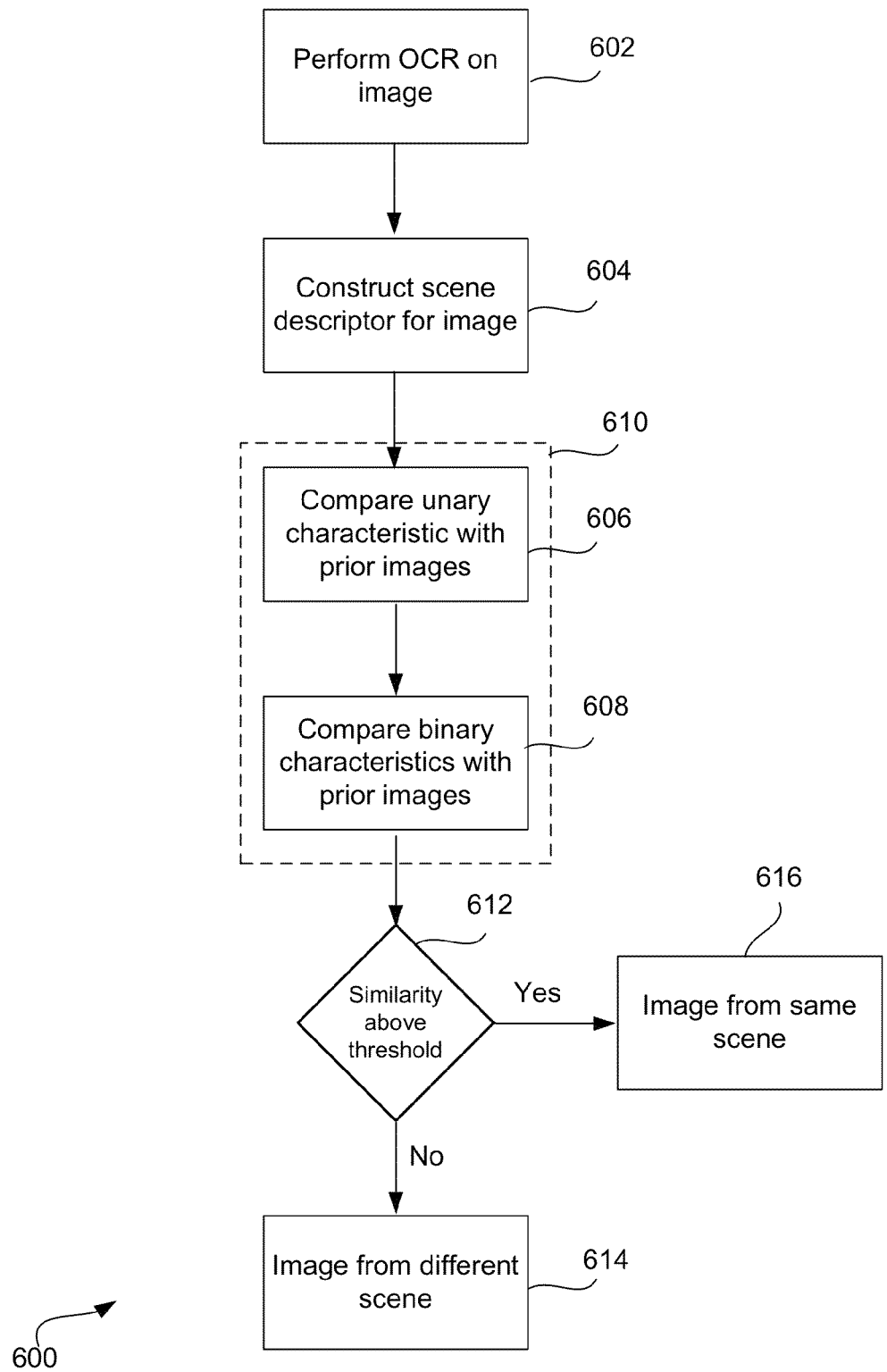
FIG. 6 illustrates a flow diagram, showing a non-limiting exemplary method for detecting an image from the same scene as a stored image.
Figure 7:
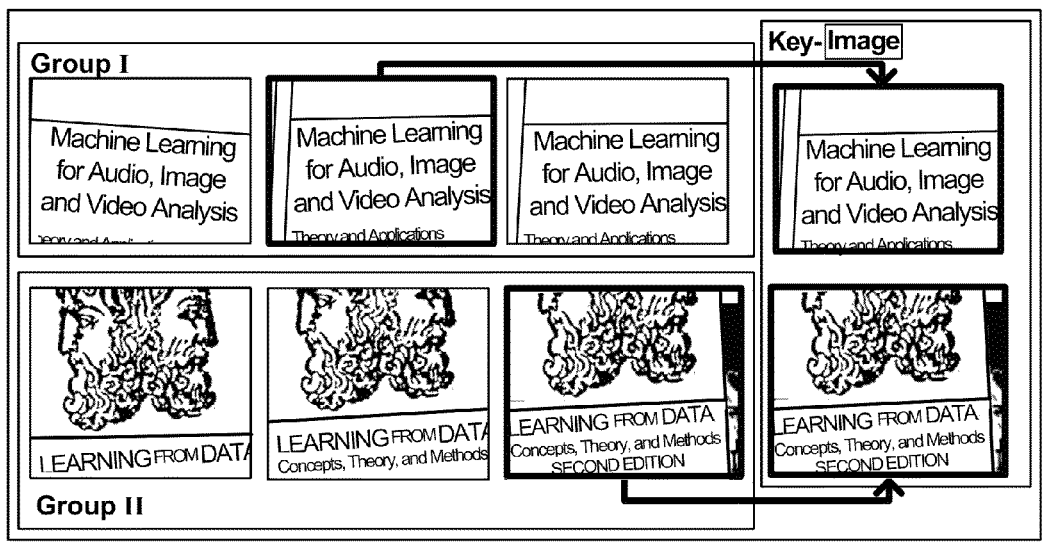
FIG. 7 depicts block diagrams, showing a selection of an image as a key image from a plurality of images.
Figure 8:
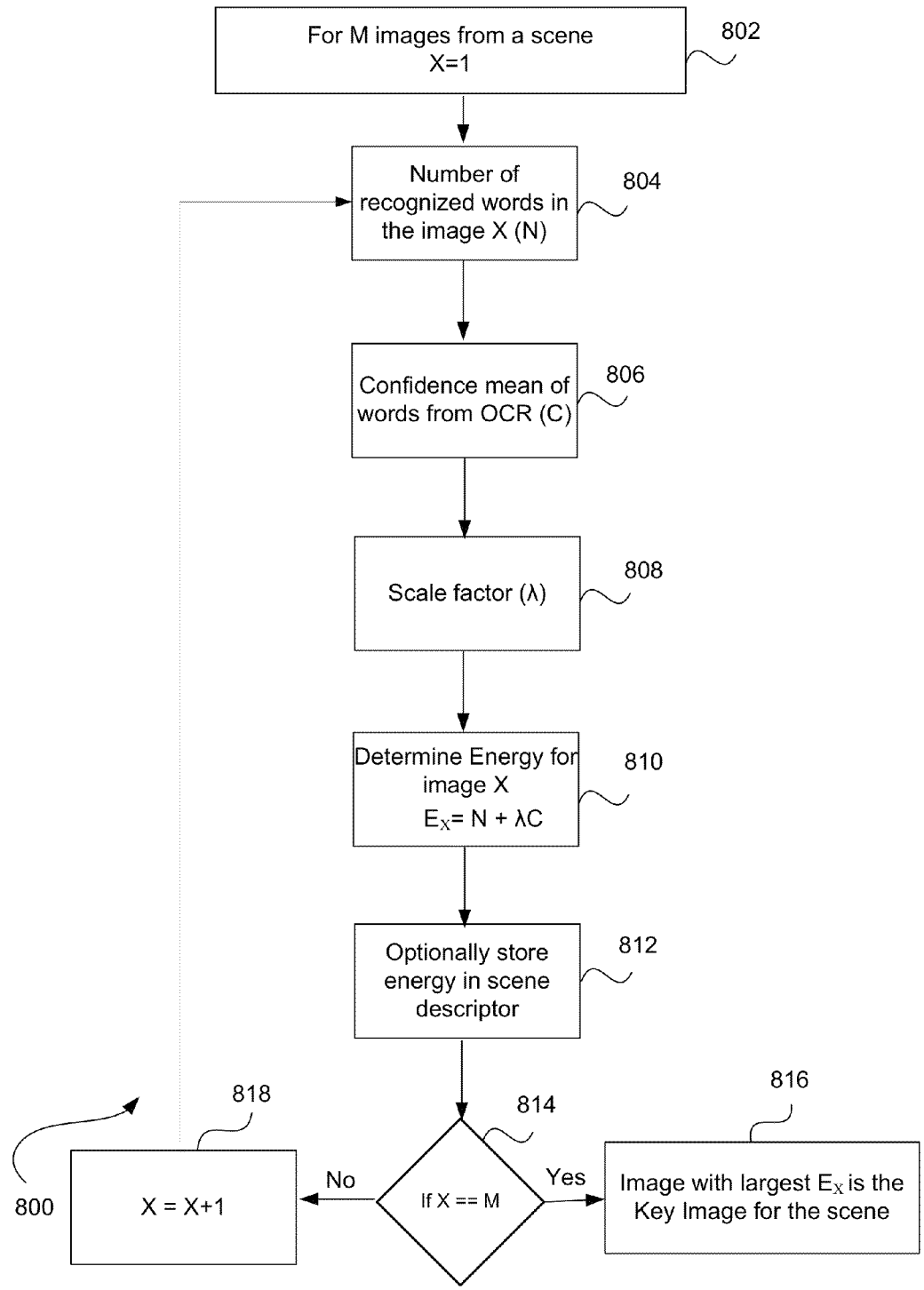
FIG. 8 illustrates a flow diagram, showing a non-limiting exemplary method for selection of an image as a key image from a plurality of images.
Figure 14:
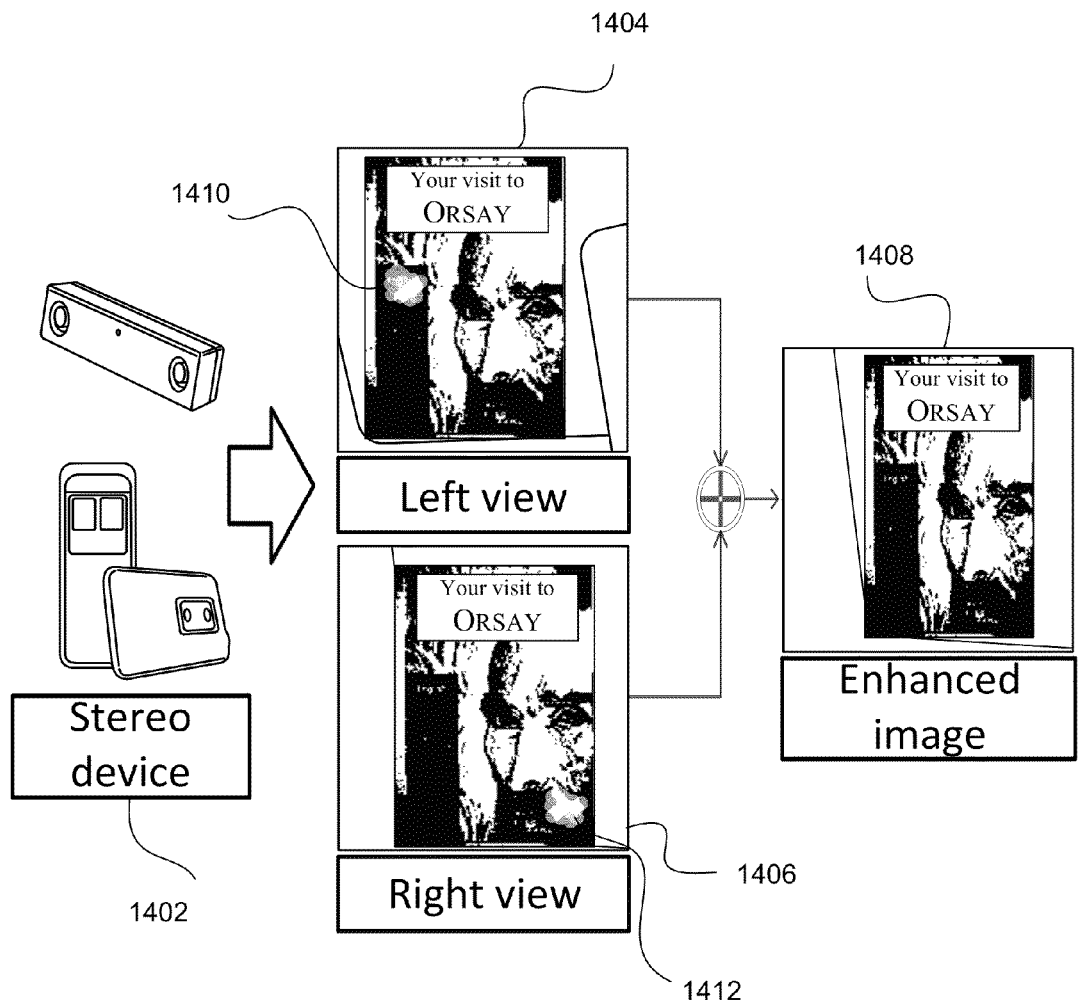
FIG. 14 depicts a diagram that illustrates embodiments of the invention for removing or reducing glare from an image.
Figure 15:
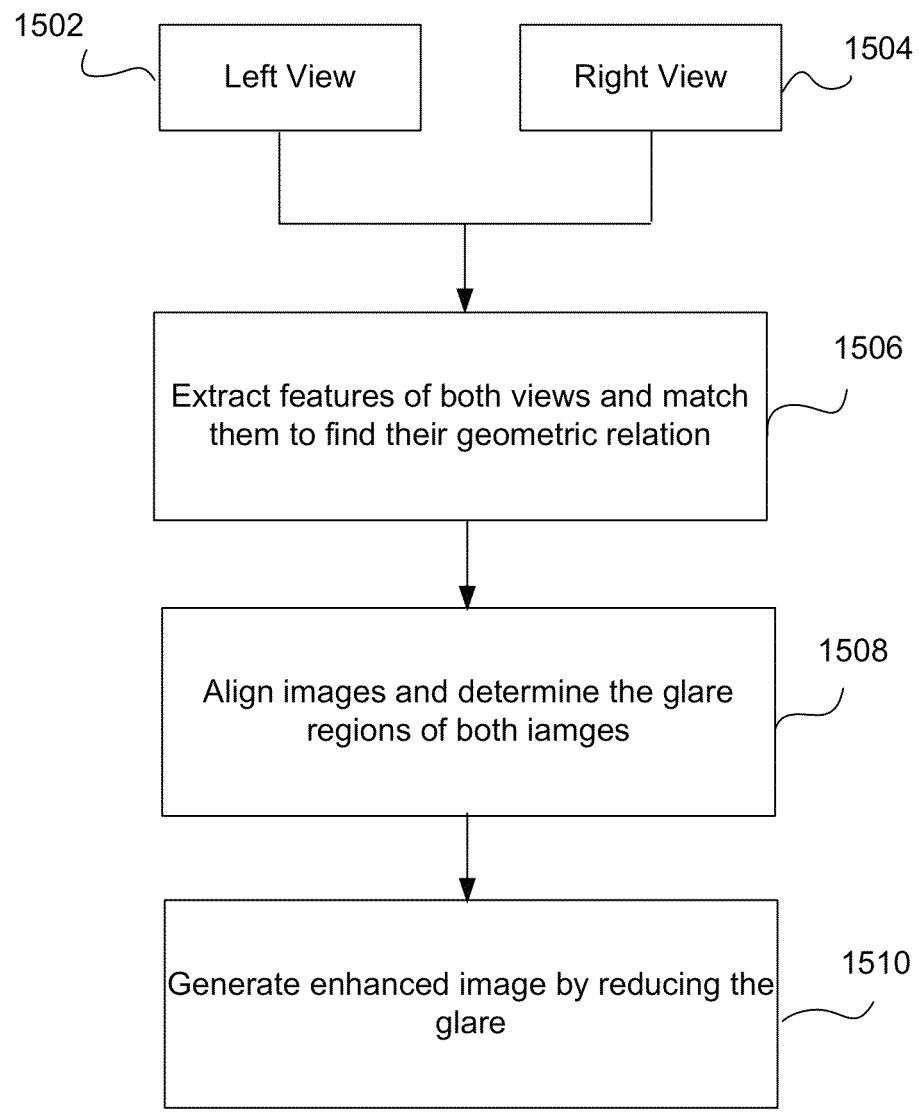
FIG. 15 is a flow diagram illustrating an embodiment of the invention for reducing or removing reflective glare in the image according to one or more illustrative aspects of the disclosure.

An image received by the computing device 100 may be processed to generate a scene descriptor. A structure and process of generating the scene descriptor are described in more detail in FIG. 4, FIGS. 13A and 13B. Once the scene descriptor is generated for the received image, the received image is matched or compared against other images to determine if it belongs to at least one of the scenes for images stored on the computing device 100. FIG. 5 and FIG. 6 describe the matching process in more detail. If a match is found, the key image is selected from the multiple images belonging to the same scene using the energy associated with each image. FIG. 7 and FIG. 8 describe the selection process for the key image in more detail. Once the key image is selected, the images may be integrated to form a new composited image with an updated scene descriptor and the OCR cache may be updated. The integration process is described in more detail in FIG. 9 and FIG. 10. FIG. 11 describes different modules and components of an embodiment of the invention and the associated flow between those components. FIG. 12 further describes FIG. 11 with an additional tracking component. FIGS. 14 and 15 describe exemplary embodiments of the invention for reducing or removing glare from images when storing an image in a cache. FIGS. 16A, 16B, 16C and 16D describe an exemplary OCR cache update scenario using the techniques described herein for an exemplary computing device 100.

Figure 4:
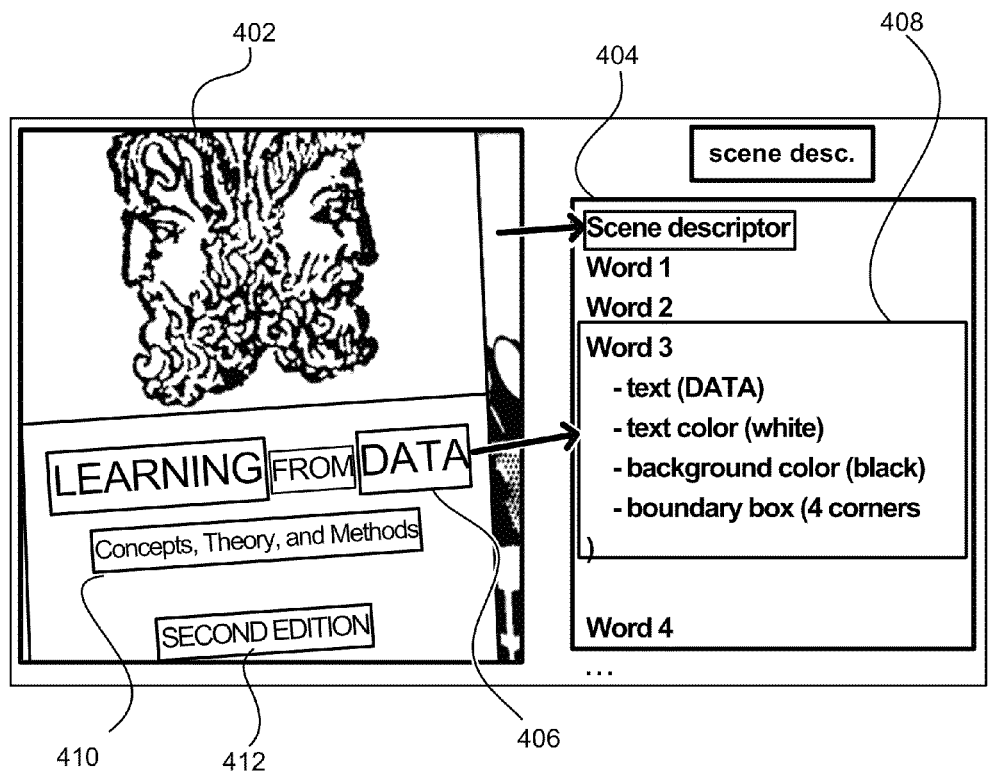
FIG. 4 depicts two block diagrams, showing a representative image of a book cover and an associated scene descriptor according to an exemplary embodiment of the invention.

FIG. 4 depicts a diagram showing a representative image of a book cover and an associated scene descriptor according to an exemplary embodiment of the invention. In aspects of the invention, the image capture module 1102 receives one or more images and the OCR engine 1104 performs OCR on the one or more images. The scene descriptor module 1106 may process the image and a scene descriptor may be generated for the image representing characteristics associated with the image. The scene descriptor may be used by the matching module in comparing the various images during the matching process in determining if any of the received or stored images belong to the same scene.

The scene descriptor may be defined in terms of portions of the image representing graphical objects. Graphical objects may include, but are not limited to symbols, characters, words, text, signs, and numbers. As shown in FIG. 4, in one implementation, the scene descriptor catalogs data about text, such as text color, background color and boundary box around one or more words. Characteristics for the graphical object detected by the computing device 100 may include unary characteristics and binary characteristics. Unary characteristics may include, but are not limited to the graphical object content, graphical object color, foreground color, background color and dimensions of portions of the image comprising the graphical object. Binary characteristics of the graphical objects may comprise the geometric relationship of the graphical objects with respect to each other and the image. In some aspects of the invention, the binary characteristics may be represented using an affinity matrix that describes the different geometric relationships of the graphical objects in the image with each other.

Referring back to block 402 of FIG. 4, the scene descriptor module 1106 may identify portions of the image comprising words "LEARNING from DATA", "Concepts, Theory, and Methods," and "SECOND EDITION." Each word may be treated as a separate descriptive entity within the scene descriptor, such as "DATA" 406 in FIG. 4. Also, words may be grouped together to form a collective descriptive entity, such as "SECOND EDITION" 412.

In FIG. 4, the portion represented by block 406, comprising the text "DATA," is described as a separate descriptive entity 408 represented by "word 3" in the scene descriptor 404. Unary characteristics for the word descriptive entity 408 may be represented through a data structure that has a field representing the text/content (i.e., DATA), the text color (i.e., white), the background color (i.e., black) and the boundary box or/and dimensions. The scene descriptor module 1106 may organize information for each word and store it in a data structure, class object or any other suitable means. Similarly, the structures representing the words associated with the scene descriptor for the image may be organized using linked lists, queues or any other suitable means for retrieving, indexing and/or updating information and stored in the storage device 125 or the memory 135.

In addition to the unary characteristics, binary characteristics for each word may also be stored by the scene description module 1106 for each word in the image (not shown). Binary characteristics include, but are not limited to the geometric relationship of the words with respect to each other. In FIG. 4, the binary characteristics for the word "LEARNING" may include the spatial relationship of the word with respect to other words and the image itself For instance, "LEARNING" is spatially the first word from the left and the top, and it has the word "from" to the right and "Concepts" below it. Comparing binary characteristics for the different scenes may be advantageous where similar words with similar characters are used in different scenes to generate different sentences. In one example, comparing the binary characteristics of the word may allow the computing device to more efficiently find matches using the relative position of the words with respect to each other.

FIG. 5 depicts a diagram, illustrating a matching process between a plurality of images received by a computing device 100 and various scenes. Computing device 100 discussed in reference to FIG. 1 above, can represent some of the components of the device used for performing embodiments of the invention described in FIG. 5. Modules and components discussed in FIG. 11 and FIG. 12, for example the matching module 1108, may also be implemented as components of the computing device 100 and may be used in performing embodiments of the invention as discussed in FIG. 5. Image 502 represents an image received using the camera 150 coupled to the computing device 100. In one embodiment, the image capture module 1102 captures the image for further processing and passes the image data to the OCR engine 1104. The OCR engine 1104 processes the image 502 to generate OCR results, such as data associated with the image. As discussed in FIG. 4, a scene descriptor is generated and associated with the image 502. Image 504 and image 506 are images obtained prior to image 502 and have associated scene descriptors. Components of the computing device 100, may store images 504 and 506 either at a temporary buffer or in the OCR cache. In one implementation, the temporary buffer or the OCR cache 1112 may use sections of the Working Memory 135 described in FIG. 1.

Components of the computing device 100, such as the matching module 1108, may compare the unary and/or binary characteristics for the scene descriptor for image 502 against the unary and/or binary characteristics for the scene descriptors for images 504 and 506. For instance, image 502 has a word descriptive entity for "LEARNING," "from" and "DATA". However, image 506 only has a word descriptive entity for "Learning." Even if there was a positive unary match between "LEARNING" from image 502 and "Learning" from image 506, the binary characteristics for the two words will not match. In image 506, "Learning" is not the first word from the left and does not have from to its right, as is the case in image 502. Therefore, embodiments of the invention may conclude that image 502 and image 506 do not belong to the same scene.

In contrast, the unary and binary characteristics associated with the scene descriptor for image 502 and image 504 may form a positive match. Both images have the same unary characteristics for each word in the image scaled by a factor to account for the different resolutions. Also, the geometric relationship between the words is the same in both images. The only significant difference between image 502 and image 504 is that image 504 does not have "SECOND EDITION" as part of the image. Aspects of the invention may implement mechanisms for discounting such differences between images from the same scene.

In one implementation, components of the computing device 100, such as the matching module 1108 may assign a weight to each similarity and difference between any two given characteristics for a scene descriptor. The assigned weights may be added for similarities and subtracted for differences. A threshold may be generated or pre-determined The matching module 1108 may associate two given images to the same scene, if the weighted sum of the similarities and differences in the scene descriptors for the two images is above the threshold. If the weighted sum of the similarities and differences in the scene descriptors for the two images is below the threshold, the images may be considered as representing different scenes.

FIG. 6 illustrates a flow diagram, showing a non-limiting exemplary matching process for associating an obtained image with a scene for a stored image. At step 602, components of the computing device 100, such as the matching module 1108, perform OCR on the received image. Computer device 100 discussed in reference to FIG. 1 above can represent some of the components of the mobile device used for performing the embodiments of the invention described in FIG. 6. The image is obtained using a camera 150 coupled to the computing device 100. At step 604, a scene descriptor may be generated for the received image, for example using the scene descriptor generator 1106. As described in reference to FIG. 4, portions of the image comprising graphical objects, such as text, may be recognized and further characterized in the scene descriptor. For each graphical object, both unary and binary characteristics may be defined. Unary characteristics may include, but are not limited to the graphical object content, graphical object color, foreground color, background color and dimensions of portions of the image comprising the graphical object. Binary characteristics of the graphical objects may comprise the geometric relationship of the graphical objects with respect to each other and the image. The defined characteristics for each graphical object may be stored in a data structure, class object or using any other suitable means.

At step 610, the scene descriptor of the received image is compared with the scene descriptor of an image obtained previously and stored or buffered on the computing device 100, for example by the matching module 1108. The previously obtained image and its associated scene descriptor may be stored in a temporary buffer, OCR cache or any other suitable storage medium using storage 125, memory 135 or hardware registers. While comparing the scene descriptors (step 610), at step 606, the unary characteristics of the scene descriptor for the received image may be compared against the unary characteristics of the scene descriptor associated with the stored image. At step 608, the binary characteristics of the scene descriptor for the received image may be compared against the binary characteristics of the scene descriptor associated with the stored image.

In one implementation, each similarity between any two given characteristics of scene descriptor may have an assigned weight associated with it. The assigned weights may be reflected for similarities and subtracted for differences. A threshold may be generated or pre-determined. At step 612, if the weighted sum of the similarities in the scene descriptors for the two images is above the threshold, the components of the computing device 100 may associate the images with the same scene (block 616), for example using the selection module 1110 and/or the integration module 1114. On the other hand, if the weighted sum of the similarities in the scene descriptors for the two images is below the threshold, the images may be considered as representing different scenes (block 614). Partial flows described in method 600 may be iteratively or recursively repeated to compare the scene descriptor of all the previously stored images and their associated scene descriptors from temporary memory, OCR cache 1112 or any other suitable storage medium.

It should be appreciated that the specific steps illustrated in FIG. 6 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 6 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

FIG. 7 depicts block diagrams, showing a selection process of an image as a key image from a plurality of images belonging to the same scene. As described in FIG. 4, FIG. 5 and FIG. 6, after the image is received by the computing device 100, the computing device 100 may generate the scene descriptor for the image and match the image against other images previously obtained and stored. In one implementation, the computing device selects a key image from the plurality of images belonging to the same scene. The process of selecting a key image from the plurality of images may be referred to as the selection process, and may be performed by components of the computing device 100, such as the selection module 1110 from FIGS. 11 and 12. Referring to FIG. 7, Group I has 3 images associated with a first scene and Group II has 3 images associated with a second scene. The final key image is selected and displayed in the right most column for Group I and Group II. The key-image may be the candidate image that is stored in the OCR cache 1112 representing the scene. In some instances, the key-image or information related to the key-image may be enhanced using the information from the other images before storing the key-image. For example, words that are recognized in one or more images other than the key image may be added to data associated with the key image. Below described mechanisms may be pursued in finding the key image from each group of images.

The key image may represent an image that has better resolution and clarity than other images associated with the same scene. In one aspect, components of the computing device 100 may calculate the energy associated with each image. The energy value may be stored as part of the scene descriptor for the image. The image with the highest energy may be selected as the key image from the plurality of images associated with the same scene. In one implementation, the computing device 100 (using the selection module 1110, for example) may determine the energy value using the number of recognized words from the image and the confidence mean of words from the OCR.

FIG. 8 illustrates a flow diagram, showing a non-limiting exemplary method for the selection process of an image as a key image from a plurality of images from the same scene. According to one or more aspects, any and/or all of the methods and/or method steps described herein may be implemented by and/or in a computing device 100, such as the computing device 100 and/or the device described in greater detail in FIG. 1, for instance. In one embodiment, one or more of the method steps described below with respect to FIG. 8 are implemented by a processor of the device 100 such as the processor 110 or another processor. Modules and components discussed in FIG. 11 and FIG. 12, such as the selection module 1110, may also be implemented as components of the computing device 100 and may be used in performing embodiments of the invention as discussed in FIG. 8. Additionally or alternatively, any and/or all of the methods and/or method steps described herein may be implemented in computer-readable instructions, such as computer-readable instructions stored on a computer-readable medium such as the memory 135, storage 125 or another computer readable medium.

At step 802, one or more (M) images are detected as belonging to the same scene as discussed in FIGS. 5 and 6. In some implementations, the OCR cache 1112 has only one image associated with any given scene. Any obtained image that is associated with the same scene as stored in the OCR cache 1112 may be immediately processed and integrated into the OCR cache 1112. The OCR image may be updated if the newly obtained image is selected as the key image or has additional information. In such an implementation, the selection process may only be between two images, i.e., the image stored in the OCR cache and the image recently obtained by the camera.

However, in other implementations of the invention, multiple images may be compared simultaneously to find the key image. For instance, in one implementation a window protocol may be implemented, wherein more than one image may be obtained over a period of time and processed simultaneously. From the multiple images obtained and stored temporarily, commonly more than one image may belong to the same scene, since the user may glide the mobile device over the same scene multiple times over a short span of time. Therefore, one or more images from any given window of time associated with the same scene may be compared against each other or an image stored in the OCR cache 1112 that is associated with the same scene.

M represents the number of images associated with a particular scene at any given point in time. The energy associated with each image may be calculated iteratively or recursively. The number of the iterations are represented by X. In one exemplary implementation, X may be initialized to 1. X also represents the image that is currently processed. In one aspect, the energy of the image is stored in the scene descriptor of the image.

At step 804, the number of words in the image X are recognized (N) using OCR. At step 806, the confidence mean of words from the OCR is derived (C). At step 808, the confidence associated with the recognized word is scaled by a scale factor ($\lambda$). In one embodiment, the scale factor ($\lambda$) may be determined empirically. At step 810, the energy for image X is calculated according to the following equation;

$$E_X = N + \lambda C.$$

At step 812, the energy derived for the image may be optionally stored in the scene descriptor of the image. At step 814, if X==M, then the image with the largest energy value is selected as the key image from the plurality of images associated with the same scene (step 816). If X is not equal to M, then X is incremented (step 818) and the next image X may be fetched and processed through the method 800, starting back at step 804.

In another embodiment, the iterative/recursive calculation of the energy for the images is not used. The energy of the image may be calculated for the image after it is obtained or if the image is updated with additional information that may affect the energy associated with the image. In one implementation, the energy of the image is stored in the scene descriptor for the image.

It should be appreciated that the specific steps illustrated in FIG. 8 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 8 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

Figure 9:
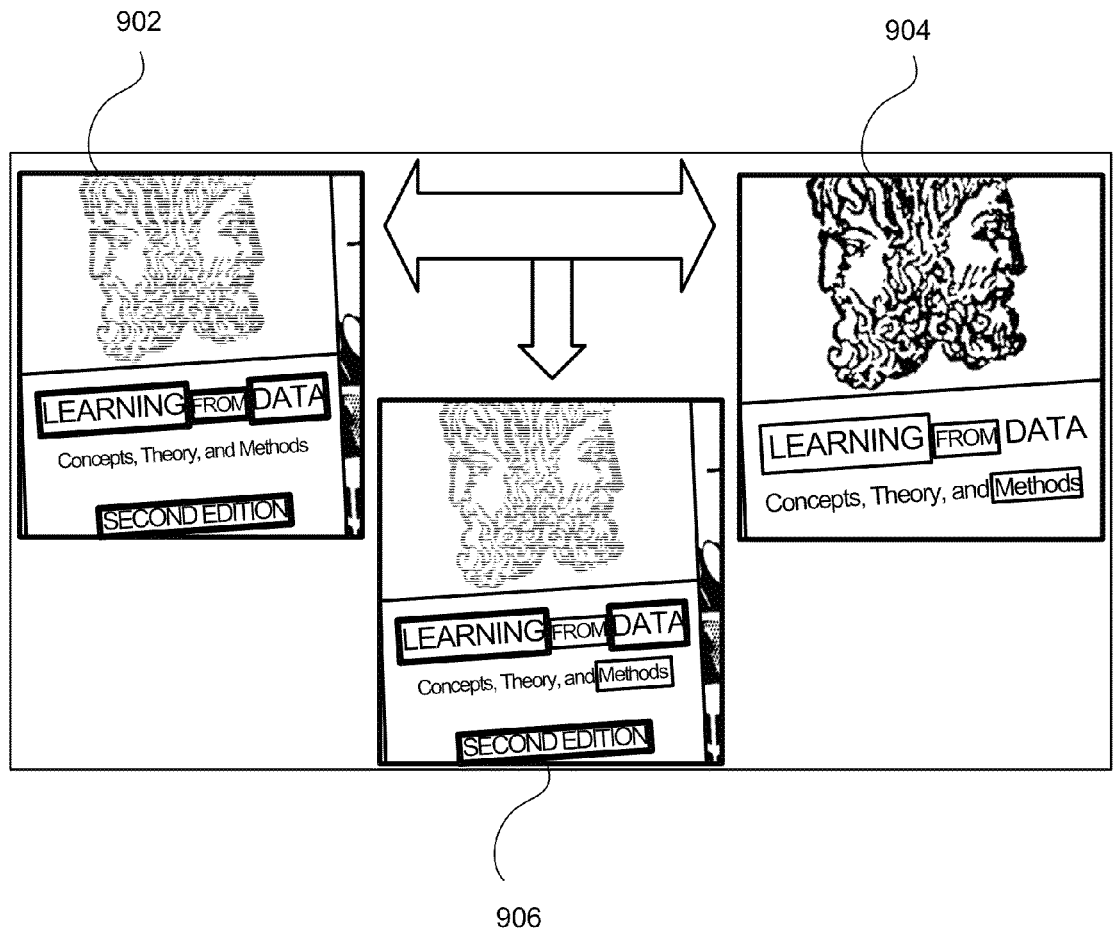
FIG. 9 depicts block diagrams, showing an integration of an image as a final image from a plurality of images from the same scene.

FIG. 9 depicts a diagram, showing a composition of an image as a final image that is stored in the OCR cache 1112 from a plurality of images from the same scene. In one embodiment, image 902 and 904 are routed through OCR engine 1104 and then the scene descriptor generator 1106 for identifying the graphical objects associated with the image and generating the scene descriptors, respectively. The matching module 1108, associates images 902 and 904 with the same scene. In one embodiment, after the matching process the images and their associated scene descriptors are routed through the selection process, by the selection module 1110 to determine the key image. For illustration purposes, image 902 is hypothetically selected as the key image from the selection process.

After the selection process, the images may be routed through the integration module 1114 for the integration process, where the two images may be integrated into a single composite image 906. In FIG. 9, image 902 is selected as the image that may be saved in the OCR cache. However, image 904 may have additional unique information that is not depicted in image 902. The additional information unique to image 904 may be composited with image 902 to form the final image 906. In one embodiment, image 906 may be newly generated from image 902 and image 904 so that all OCR results can be shown in the image 906.

The scene descriptor may also be updated. For instance, the scene descriptor for image 906 will have the characteristics defined for the scene descriptor for 902. However, since an additional unique word is added from image 904, the scene descriptor for image 906 may inherit the characteristics defined for "Methods" from image 904.

Figure 10:
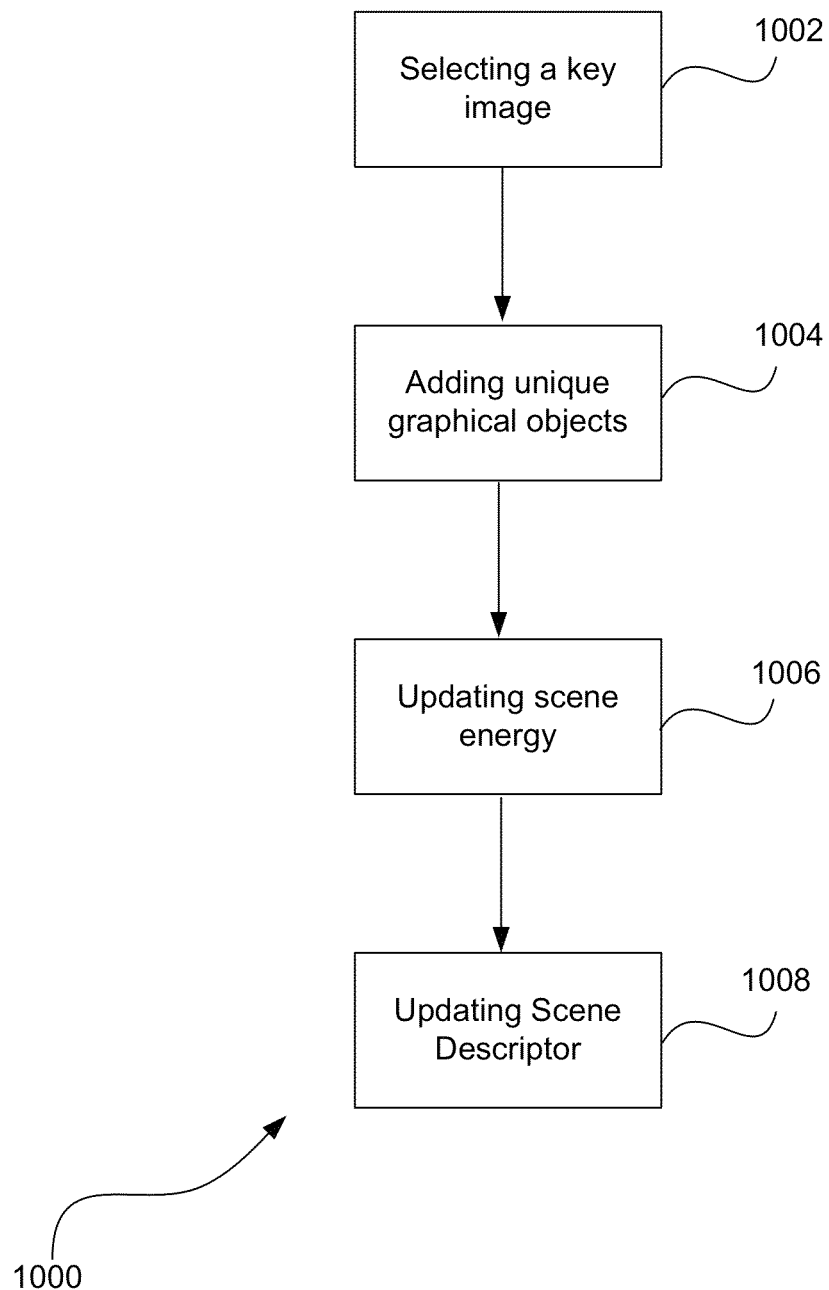
FIG. 10 illustrates a flow diagram, showing a non-limiting exemplary method for compositing a final image from a plurality of images from the same scene.

FIG. 10 illustrates a flow diagram, showing a non-limiting exemplary method for compositing an image from a plurality of images from the same scene. According to one or more aspects, any and/or all of the methods and/or method steps described herein may be implemented by and/or in a computing device 100, such as the computing device 100 and/or the device described in greater detail in FIG. 1, for instance. In one embodiment, one or more of the method steps described below with respect to FIG. 10 are implemented by a processor of the device 100 such as the processor 110 or another processor. Modules and components discussed in FIG. 11 and FIG. 12, such as the integration module 1114, may also be implemented as components of the computing device 100 and may be used in performing embodiments of the invention as discussed in FIG. 8. Additionally or alternatively, any and/or all of the methods and/or method steps described herein may be implemented in computer-readable instructions, such as computer-readable instructions stored on a computer-readable medium such as the memory 135, storage 125 or another computer readable medium.

Compositing an image, as described herein, may include but is not limited to updating or replacing the image or any associated data including the scene descriptor for the image or a representation of the image in the OCR cache. For instance, an image of a dinner menu from a restaurant stored in the OCR cache may get augmented with additional information from the received images as the camera hovers over the dinner menu in preview mode or snapshot mode and receives more images. At step 1002, a key image is selected from a plurality of images belonging to the same scene using the selection module 1110, as discussed in FIG. 7 and FIG. 8. At step 1004, any unique graphical objects identified by components of the invention, for example scene descriptor generator 1106, that are not already part of the key image may be added to the key image. In some instances the received image may have additional information, such as a region of the scene that is not already stored in the OCR cache. Vice versa, the received image may not have all the information that is included in the stored image in the OCR cache 1112. In one instance, once the key image is selected any graphical objects from the other images that are not already part of the key image are added to the image.

At step 1006, optionally, the energy for the composited image may also be updated to account for any new information added to the image. In one embodiment, the computing device 100 calculates the energy for the composited image as discussed at 810 in FIG. 8. At step 1008, the scene descriptor may also be updated with additional information. For instance, the additional image data and scene descriptor data associated with the graphical objects may be integrated with the data for the key image forming a composited image before storing the composited image in the OCR cache 1112. The same process discussed above may take place for any two or more images simultaneously, such as multiple received images and images stored in the OCR cache 1112.

It should be appreciated that the specific steps illustrated in FIG. 10 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 10 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

FIG. 11 depicts a block diagram, showing exemplary components and modules for performing methods provided by embodiments of the invention. Computer device 100 discussed in reference to FIG. 1 above, can represent some of the components of the mobile device used for performing the embodiments of the invention described in FIG. 11. The components and modules discussed in FIG. 11 may be implemented in hardware, software, firmware or any combination thereof.

In one embodiment, the computing device 100 may be switched into an OCR caching mode that uses automatic and intelligent OCR caches. The OCR cache 1112 may utilize portions of the working memory 135 described in FIG. 1. In one embodiment, the preview mode with automatic and intelligent OCR cache update is triggered when a program or application, such as a camera keyboard, is on and turned off when the camera keyboard is turned off.

Image capture module 1102 may obtain, capture or receive one or more images. In one embodiment, the image capture module 1102 uses one or more cameras 150 coupled to the computing device to obtain the one or more images. The OCR engine 1104 processes the image, (for instance, using the processor 110) and recognizes portions of the image comprising graphical objects embedded in the image. Graphical objects may include, but are not limited to symbols, characters, words, signs, and numbers. Additionally, the OCR engine may process the image and begin populating a scene descriptor for each image.

The scene descriptor generator 1106 may be implemented as part of the OCR cache system 1124, and may generate and populate the scene descriptor. The scene descriptor describes the characteristics of the graphical objects associated with the image. The scene descriptor may be defined in terms of portions of the image representing multiple graphical objects.

Characteristics for the graphical object may include unary characteristics and binary characteristics. Unary characteristics may include, but are not limited to the graphical object content, graphical object color, foreground color, background color, confidence associated with the OCR result, and dimensions and boundary of the portions of the image comprising the graphical object. Binary characteristics of the graphical objects may comprise the geometric relationship of the graphical objects with respect to each other and the image. In some aspects of the invention, the binary characteristics may be represented using an affinity matrix that describes the different geometric relationships of the graphical objects in the image with each other. FIG. 4 and FIG. 6 discuss some of the steps performed by the scene descriptor generator 1106 in more detail.

The matching module 1108 may match the scene descriptor of the one or more received images and the stored images from the OCR cache 1112. A match between the scene descriptors of any two images denotes that the two images are associated with the same scene. Similarities and differences in the scene descriptors between the images may be utilized to find images that are closely enough aligned with each other to reasonably belong to the same scene. FIG. 5 and FIG. 6, describe exemplary embodiments for finding a match in more detail.

If the matching module 1108 does not find a match between the received image from the image capture module 1102 and the images stored in the OCR cache 1112 the image is passed on to the insertion module 1116 to be stored in the OCR cache 1112. The new image stored in the OCR cache 1112 represents a new scene obtained by the computing device 100.

If the matching module 1108 does find a match between the received image and an image from the OCR cache 1112, the matched images (or pointers to the images) are forwarded to the selection module 1110 for selecting the key image. At block 1114, the key image from the two images is determined using the selection process using the energy associated with the received image and the matched image from the OCR cache 1112. In one embodiment, the energy is stored in the scene descriptor for the image. In another embodiment, the energy associated with each image is derived at the selection module 1110. In one implementation, the energy of the image is defined to be directly proportional to the number of words recognized for the image and the confidence associated with it. The following equation may represent an implementation for deriving the energy, $$E = N + \lambda C, \text{ where}$$

N is the number of words recognized in the image, C is the confidence mean of the words from the OCR and $\lambda$ is the scale factor. In one aspect, $\lambda$ is derived using empirical data. The energy of the image may be calculated for the image after it is received or if the image is updated with additional information that may affect the energy associated with the image.

The integration module 1114 may integrate scene descriptor and other image data from the non-key images with the key image to form a composited image. Compositing an image, as described herein, may include but is not limited to updating or replacing the image or any associated data including the scene descriptor for the image or a representation of the image in the OCR cache. In one instance, the stored in image in the OCR cache 1112 and the received image may have overlapping regions with scene descriptor information that is the same between the two images for identical graphical objects. However, in some instances the received image may have additional information, such as a region of the scene that is not already stored in the OCR cache. Vice versa, the received image may not have all the information that is included in the stored image in the OCR cache 1112. In one instance, once the key image is selected any graphical objects from the other images that are not already part of the key image are added to the image. FIG. 10 discusses some of the steps performed by the integration module 1114 in more detail.

In one example, an image of a dinner menu from a restaurant stored in the OCR cache may get augmented with additional information from the received images as the camera hovers over the dinner menu in preview mode or snapshot mode and receives more images. In another example, the integration module may remove or reduce glare form the image before storing the composited image in a cache such as the OCR cache 1112. The integration process may facilitate removing the glare by identifying a first region with glare from the key image, identifying a second region without glare from the non-key image, wherein the first region and the second region represent the same region of scene; and compositing a final image using the key image and the second region without glare from the non-key image to remove glare.

In one embodiment, the OCR caching mode with automatic and intelligent OCR cache update is operational when a program or application, such as a camera keyboard, is turned on and this mode is deactivated when the camera keyboard is turned off or otherwise halted or suspended. In some embodiments, the camera keyboard may allow information captured by the camera, for example text recognized in an image or associated with a key image of a scene, to be input to an application. Furthermore, the device display coupled to the computing device 100 may also continuously display the contents of the OCR cache 1112 when the OCR caching mode (with automatic and intelligent OCR cache update in some embodiments) is operational (i.e., the camera keyboard is turned on or the program or application is resumed or otherwise operational). Also, when the camera keyboard is stopped, cache data for the OCR cache 1112 may be saved from memory to the device storage 1120. The device storage 1120 may be one of the storage devices 125 described in FIG. 1. And when the camera keyboard is started, cache data for the OCR cache 1112 may be loaded from device storage 1120 to the memory. In one implementation, the OCR cache 1112 is implemented using a queue of images. However, a linked list, class object, or any other suitable means comprising a number of images or amount of data may be used for implementing the OCR cache 1112.

FIG. 12 depicts another block diagram, showing exemplary components for performing methods provided by embodiments of the invention. In addition to the components described in FIG. 11, FIG. 12 has a tracking module 1222 that continuously tracks the scene in the OCR caching mode from the image capture module 1102 and feeds the input to the matching logic in block 1108. Tracking the scene is particularly helpful in aiding the matching logic, when the user is continuously gliding the mobile device over the same scene to generate a better or larger image associated with the scene. In this scenario, the complexity and the processing time and power for the matching logic is significantly reduced for every new image that is obtained. In one embodiment, movement of graphical objects (and the associated boxes used around the graphical objects to frame the graphical objects) can be used in solving the matching problem. Referring back to the dinner menu example from FIG. 11, the tracking module can constantly track the image as the computing device 100 hovers over the dinner menu and help the computing device 100 build a single integrated image of the dinner menu. In some embodiments, one or more of the modules 1104, 1106, 1108, 1110, 1112, 1114, 1116, 1124, and 1222 are implemented in one or more processors or processing cores of the device 100, for example in the processor 110.

FIG. 13A and FIG. 13B depict exemplary scene descriptors for an image containing text. FIG. 13A is a scene descriptor generated by the scene descriptor generator 1106. The scene descriptor comprises image data such as image resolution, color depth and other such image characteristics. Additionally, the scene descriptor may comprise the characteristics associated with each text word such as the text content, region of interest (ROI), confidence associated with the proper recognition of the word using OCR, estimated text color and background color.

FIG. 13B illustrates an updated scene descriptor. The energy value for the scene descriptor may be updated by the selection module 1110 and the integration module 1114 once the energy for each image is calculated or updated. Similarly, additional entries for new text may be added (example, TextN+1 in FIG. 13B) if new text is added to the key image for the OCR cache 1112 at the integration module 1114.

FIG. 14 depicts a diagram that illustrates embodiments of the invention for removing or reducing glare from an image. Images acquired, using a camera 150, in indoor settings are sometimes affected by the reflected glare. For instance, a dinner menu may have glare reflecting off the menu from the dinner lights. The reflected glare may degrade the performance of camera-based applications, such as optical character recognition (OCR), for capturing, detection and recognition of images. Reflected glare may be caused by a significant ratio of luminance between the object of interest and the glare source. Factors such as the angle between the object of interest, the glare source and the camera have significant impacts on the experience of glare.

Embodiments of the invention provide techniques for detecting and reducing reflected glare using images of the same subject of interest from two or more positions. The image may be acquired by moving the camera 150 between the two or more positions or by using multiple cameras 150, such as a stereo camera. Acquiring the image from two or more positions allows for changing the angle between the camera with respect to the glare source and the object of interest. The two acquired images from slightly different vantage points may represent glare in different portions of the image for the same object of interest, allowing for a compositing of an image with reduced glare.

FIG. 14 is a block diagram representing an exemplary embodiment of the invention. In FIG. 14, a stereo camera computing device with a stereo camera 150 coupled to the device (device 1402) is used for acquiring two or more images of the same object of interest. In one implementation, the images are acquired simultaneously. In another embodiment, the images may be acquired one after the other using a single camera from different vantage points at different times. As seen in FIG. 14, the image acquired using the left view (image 1404) and the image acquired using the right view (image 1406) both have reflected glare (1410 and 1412). However, since the angle at which the two cameras capture the image with respect to the glare source and the object of interest are different, the glare is present in different portions of the image. As shown in FIG. 14, embodiments of the invention composite an enhanced image using the left view image and the right view image. In one embodiment, the composition of the two images into one enhanced image may be performed by the integration module 1114. Once the computing device 100 identifies two matching images at the matching module 1110, the integration module can enhance the image by removing or reducing the glare to generate the final image 1408 before storing the final image in the OCR cache 1112, as further discussed in FIG. 15 below.

FIG. 15 is a flow diagram illustrating an embodiment of the invention for reducing or removing reflective glare in the image according to one or more illustrative aspects of the disclosure. According to one or more aspects, any and/or all of the methods and/or method steps described herein may be implemented by and/or in a computing device 100, such as the computing device 100 and/or the device described in greater detail in FIG. 1, for instance. In one embodiment, one or more of the method steps described below with respect to FIG. 15 are implemented by a processor of the device 100 such as the processor 110 or another processor. Modules and components discussed in FIG. 11 and FIG. 12, such as the scene descriptor generator 1106, matching module 1108, and/or integration module 1114 may also be implemented as components of the computing device 100 and may be used in performing embodiments of the invention as discussed in FIG. 16. Additionally or alternatively, any and/or all of the methods and/or method steps described herein may be implemented in computer-readable instructions, such as computer-readable instructions stored on a computer-readable medium such as the memory 135, storage 125 or another computer readable medium.

In one embodiment, a stereo camera 150 may be used to acquire two images of the object of interest from two different positions. In another embodiment, two images are acquired one after the other from two different positions. At step 1502, a first image from the left view is acquired and at block 1504, a second image from the right view is acquired. Steps performed at blocks 1502 and 1504 may occur simultaneously or one after another. In another embodiment, a received image from the camera 150 and an image from the OCR cache 1112 may be used for removing glare from an image stored in the OCR cache 1112, or two images from the OCR cache 1112 may be used. At step 1506, the features from both the images may be extracted and geometric relationships between the two images may be derived. In one embodiment, the OCR engine 1104 and the scene descriptor generator 1106 may identify the various graphical objects in the image and their relationship to each other as previously discussed in FIG. 4. In another embodiment, features are extracted using conventional feature extraction algorithms such as Harris corner, fast corner, etc. The features in the glare regions may be estimated and eliminated. The matching module 1110 may match the images and features of the images such as the graphical objects using the matching process. In another embodiment, the features may be matched, using conventional descriptors (SIFT, SURF, etc.) and matching schemes, such as RANSAC (RANdom SAmple Consensus). A baseline constraint system may be utilized in constraining the search space for finding correspondence between features. At block 1508, the images may be aligned based on their geometric relationship. Furthermore, the glare regions of for the images are detected. In one embodiment, the glare regions are determined by detecting the difference between overlapping regions of the two images. In one implementation, computing device 100 identifies the glare in a one region of one of the images by detecting the difference in a plurality of features of the first image and the second image from the same scene. For example, a reduced number of features in a region may be used to identify a glare in some embodiments.

Finally, at block 1510, using the integration process, for example with the integration module 1114, an enhanced image may be generated by compositing the two images, using overlapping regions from the two images with less glare, for reducing the glare effect. In one embodiment, embodiments of the invention identify a first region with glare from one of the images from the two or more images from the first scene, and identify a second region without glare from a second image from the two or more images from the first scene, wherein the first region and the second region represent the same region of the first scene. Using the first image and the second image, a final image may be composited with reduced or no glare. Different techniques, such as selecting informative patches between two images, segmenting foreground and background for better recognition, may be used in compositing the image. The composited image with reduced or removed glare may be stored in a cache such as the OCR cache 1112.

It should be appreciated that the specific steps illustrated in FIG. 15 provide a particular method of switching between modes of operation, according to an embodiment of the present invention. Other sequences of steps may also be performed accordingly in alternative embodiments. For example, alternative embodiments of the present invention may perform the steps outlined above in a different order. To illustrate, a user may choose to change from the third mode of operation to the first mode of operation, the fourth mode to the second mode, or any combination there between. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of the process.

FIG. 16 depicts an exemplary implementation for a user interface using a simplified representation of a computing device 100, such as a mobile device operating in the OCR caching mode with automatic and intelligent OCR cache updates. For example, the user interface may be displayed by the output device 120. FIGS. 16A, 16B, 16C, and 16D represent the computing device 100 at consecutive points in time. An area 1604, located at the top portion of the computing device 100 represents a field of view visible to the user through lens of the camera coupled to the computing device 100. The narrow strip depicted towards the bottom portion of the figures represents the OCR cache 1112. In one aspect, the representations of the images in the OCR cache 1112 are viewable by the user as thumbnails in the narrow strip depicted towards the bottom portion of the mobile device (1606, 1608 and 1610). In one embodiment, OCR results are depicted in the strip instead of images. In another embodiment, both images and OCR results are depicted. The user may select the OCR cache image and manipulate the text in the image by selecting the text and performing common text editing functions, such as edit, copy and paste. In an exemplary usage case, the user may select the text from the OCR cache, for example by touching the image or OCR result on a touchscreen displaying the user interface described above. Selecting an image in the narrow strip may cause the image to increase in size, for example to be displayed in the area 1604, such that OCR results may be selected with greater precision. In some embodiments, selection may be directly from the narrow strip. The information identified or selected by the user, for example based on a touch of the user or a touchless gesture—which may be performed with a user's hand, finger, eyes, head, or other item controlled by the user—may be translated, submitted for performing a search, or otherwise input into a program or application, for example by being input into a text box. In some embodiments, the number of images or OCR results may be greater than can be displayed on a screen of the computing device 100. In one such embodiments, the user may scroll between images or results or otherwise toggle the visible images or results, for example by swiping a finger on the touchscreen in order to advance or retract the strip.

Figure 16A:
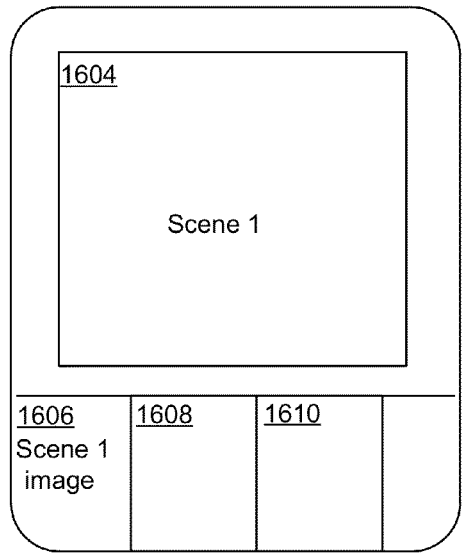
FIGS. 16A, 16B, 16C, and 16D depict an exemplary implementation for a user interface using an overly simplified mobile device operating in the OCR caching mode with automatic and intelligent OCR cache updates.
Figure 16B:
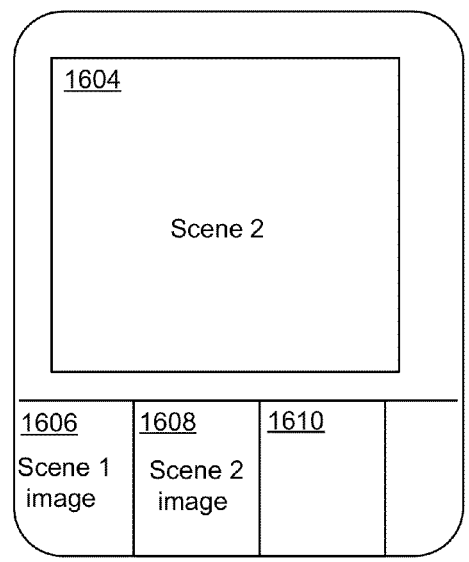

Referring to FIG. 16A, scene 1 may represent the field of view of the camera 150. The camera 150 may capture an image representing scene 1 and stores the image in the OCR cache with the scene descriptor, according to embodiments of the invention, since the OCR cache 1112 is empty at the time associated with FIG. 16A. In FIG. 16B, scene 2 is in the field of view of the camera. The camera 150 may capture an image representing scene 2. Using techniques discussed herein, components of the device 100 perform the matching process and compare the image captured for scene 1 from the OCR cache with the image captured for scene 2. Since the images belong to different scenes, a match is not found and the OCR cache is updated with the image captured for scene 2.

Figure 16C:
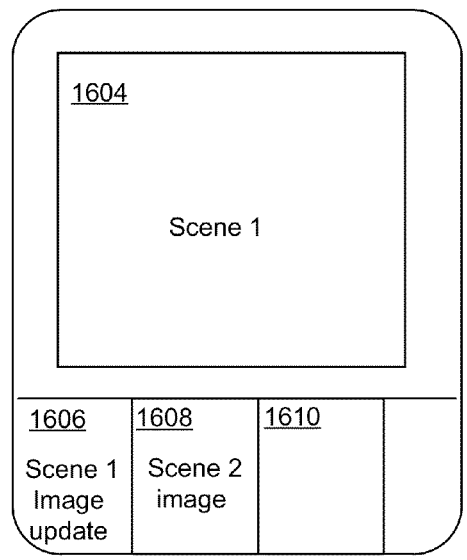
Figure 16D:
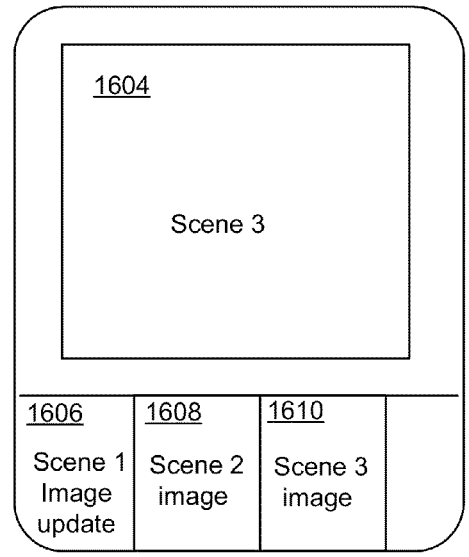

In FIG. 16C, scene 1 is again in the field of view of the camera 150. The image representing scene 1 is obtained by the camera 150. This time when the components of the device perform a comparison between the scene descriptor for the received image and the scene descriptor of the images stored in the OCR cache, a match is found. Using the calculated energies of both the images from the scene descriptors, a key image may be selected from the two images. As part of the integration process, any unique words found in the non-key image may be added to the image and the scene descriptor may be updated. Further, any words or results in the scene descriptor may be updated or replaced by other words or results having a higher confidence. The integration process is described in more detail in FIG. 9 and FIG. 10. In one implementation, additionally, glare may also be reduced or removed from the key image, as discussed in FIGS. 14 and 15. As shown in FIG. 16C, the OCR cache 1112 for scene 1 is updated with the new image and scene descriptor. Similar to FIG. 16B, FIG. 16D has new scene in the field of view. An image representing the scene 3 is captured and the OCR cache 1112 is updated with the new image. In some embodiments, the key images are displayed in the narrow strip in the order in which the scenes are identified, for example as illustrated in FIGS. 16A-16D. In some embodiments, the order of the key images varies based on which scene was most recently detected. For example, a key image representing the most recently detected scene may always be shown at the far left side of the narrow strip. Other orders or techniques of displaying key image(s) may additionally or instead be used.

Cache update as describe herein may be advantageous to the user, since this may allow the user to access all of the information associated with the same scene or with a plurality of scenes. Furthermore, with the overlap with image information between multiple images for the same scene over time, the techniques described herein may store the best information or newly acquired information associated with the scene, therefore further refining the results over time. Other advantages associated with the techniques described herein may include reduced memory space needed for storing the OCR results and reduced number of hits to the OCR cache resulting in faster performance in the overall system.

What is claimed is:
1. A method, comprising:
 receiving a plurality of images;
 recognizing data in each of the plurality of images, wherein recognizing data in each of the plurality of images comprises performing optical character recognition on the plurality of images;

determining that at least two images of the plurality of images comprise information from a first scene, based at least in part on the recognized data;

calculating an energy of each of the at least two images based on a number of graphical objects recognized in each image and a confidence for the recognition of each of the number of graphical objects; and storing a final image representing the first scene using at least one image of the at least two images and the recognized data associated with the at least one image, wherein the at least one image includes a key image selected by comparing the energies associated with each image of the at least two images.

2. The method of claim 1, wherein the receiving comprises serially capturing the plurality of images using a camera.

3. The method of claim 1, wherein storage of the at least one image of the plurality of images and the recognized data for the at least one image is maintained while a following image is captured and data is recognized in the following image.

4. The method of claim 1, wherein prior to storing the final image, the method further comprises compositing the final image using the at least two images and the recognized data associated with the at least two images, wherein the storing comprises storing the composited image.

5. The method of claim 4, wherein the compositing comprises incorporating elements from a second image of the at least two images into the at least one image to create the final image.

6. The method of claim 4, wherein the final image comprises the at least one image, wherein the compositing comprises incorporating the recognized data of a second image of the at least two images into the recognized data of the at least one image.

7. The method of claim 1, wherein the determining comprises comparing one or more of graphical object values, graphical object colors, background color and foreground color in each of the at least two images.

8. The method of claim 1, further comprising determining that one or more images of the plurality of images comprise information from one or more scenes other than the first scene, and displaying the final image and one or more images respectively representing the one or more scenes or displaying the recognized data for the at least one image and for the one or more scenes.

9. The method of claim 8, further comprising determining that a user selected one of the displayed images or displayed recognized data for the one image, and inputting information related to the selected image or recognized data into a program or application.

10. The method of claim 1, wherein prior to storing the final image, the method further comprises:

identifying a first region with glare from a first image from two or more images from the first scene;

identifying a second region without glare from a second image from the two or more images from the first scene, wherein the first region and the second region represent the same region of the first scene; and compositing the final image with reduced glare using the first image and the second region without glare from the second image.

11. A device, comprising:

one or more processors;

one or more computer-readable storage devices coupled to the one or more processors processor; and a plurality of modules stored in the one or more computer-readable storage devices and configured to be executed by the one or more processors, the plurality of modules including:

an image module configured to receive a plurality of images;

an OCR engine configured to recognize data in each of the plurality of images using optical character recognition;

a matching module configured to determine that at least two images of the plurality of images comprise information from a first scene, based at least in part on the recognized data;

a selection module configured to select the at least one image from the at least two images, wherein selecting the at least one image includes calculating the energy of each of the at least two images based on a number of graphical objects recognized in each image and a confidence for the recognition of each of the number of graphical objects; and an integration module configured to store a final image representing the first scene using the at least one image of the at least two images and the recognized data associated with the at least one image, wherein the at least one image includes a key image selected by comparing the energies associated with each image of the at least two images.

12. The device of claim 11, wherein the image module is configured to serially capture the plurality of images using a camera coupled to the device.

13. The device of claim 11, wherein prior to storing the final image, the integration module is further configured to composite the final image using the at least two images and the recognized data associated with the at least two images, and wherein the storing comprises storing the composited image.

14. The device of claim 13, wherein the compositing comprises incorporating elements from a second image of the at least two images into the at least one image to create the final image.

15. The device of claim 13, wherein the final image comprises the at least one image, wherein the compositing comprises incorporating the recognized data of a second image of the at least two images into the recognized data of the at least one image.

16. The device of claim 11, wherein the determining comprises comparing one or more of graphical object values, graphical object colors, background color, foreground color, and a boundary box around recognized text in each of the at least two images.

17. The device of claim 11, wherein the matching module determines that one or more images of the plurality of images comprise information from one or more scenes other than the first scene, and wherein the device further comprises a device display configured to display the final image and one or more images respectively representing the one or more scenes or data recognized for the at least one image or to display the recognized data for the at least one image and for the one or more scenes.

18. The device of claim 17, further comprising an input device configured to receive a user selection of one of the displayed images or displayed recognized data for the one image, wherein information related to the selected image or recognized data is input into a program or application.

19. The device of claim 18, wherein an Internet query is submitted using the input information, a translation is determined based on the input information, or text corresponding to the input information is entered into a text box.

20. The device of claim 11, wherein prior to the integration module storing the final image, the matching module is further configured to:
identify a first region with glare from a first image from two or more images from the first scene; and
identify a second region without glare from a second image from the two or more images from the first scene, wherein the first region and the second region represent the same region of the first scene,
wherein the integration module is configured to composite the final image with reduced glare using the first image and the second region without glare from the second image.

21. A non-transitory computer readable storage medium, wherein the non-transitory computer readable storage medium comprises instructions executable by a processor, the instructions comprising instructions to:
receive a plurality of images;
recognize data in each of the plurality of images, wherein recognizing data in each of the plurality of images comprises performing optical character recognition on the plurality of images;
determine that at least two images of the plurality of images comprise information from a first scene, based at least in part on the recognized data;
calculate an energy of each of the at least two images based on a number of graphical objects recognized in each image and a confidence for the recognition of each of the number of graphical objects; and
store a final image representing the first scene using at least one image of the at least two images and the recognized data associated with the at least one image, wherein the at least one image includes a key image selected by comparing the energies associated with each image of the at least two images.

22. An apparatus, comprising:
means for receiving a plurality of images;
means for recognizing data in each of the plurality of images, wherein recognizing data in each of the plurality of images comprises performing optical character recognition on the plurality of images;
means for determining that at least two images of the plurality of images comprise information from a first scene, based at least in part on the recognized data;
means for calculating an energy of each of the at least two images based on a number of graphical objects recognized in each image and a confidence for the recognition of each of the number of graphical objects; and means for storing a final image representing the first scene using at least one image of the at least two images and the recognized data associated with the at least one image, wherein the at least one image includes a key image selected by comparing the energies associated with each image of the at least two images.

23. The apparatus of claim 22, wherein the means for receiving comprises means for serially capturing the plurality of images using a camera.

24. The apparatus of claim 22, wherein storage of the at least one image of the plurality of images and the recognized data for the at least one image is maintained while a following image is captured and data is recognized in the following image.

25. The apparatus of claim 22, wherein the apparatus further comprises means for compositing, prior to storing the final image, the final image using the at least two images and the recognized data associated with the at least two images, wherein the storing comprises storing the composited image.

26. The apparatus of claim 22, wherein the means for determining comprises means for comparing one or more of graphical object values, graphical object colors, background color and foreground color in each of the at least two images.

27. The apparatus of claim 22, comprising means for determining that one or more images of the plurality of images comprise information from one or more scenes other than the first scene, and means for displaying the final image and one or more images respectively representing the one or more scenes or means for displaying the recognized data for the at least one image and for the one or more scenes.

28. The apparatus of claim 27, further comprising means for determining that a user selected one of the displayed images or displayed data for the one image, and means for inputting information related to the selected image or recognized data into a program or application.

29. The apparatus of claim 22, further comprising:
means for identifying a first region with glare from a first image from two or more images from the first scene;
means for identifying a second region without glare from a second image from the two or more images from the first scene, wherein the first region and the second region represent the same region of the first scene; and
means for compositing the final image with reduced glare using the first image and the second region without glare from the second image.

* * * * *